US005534645A

United States Patent [19]

Quotschalla et al.

[11] Patent Number: 5,534,645
[45] Date of Patent: Jul. 9, 1996

[54] TRIVALENT PHOSPHORUS COMPOUNDS STABILIZED WITH AMINES

[75] Inventors: Udo Quotschalla, Heppenheim, Germany; Helmut Linhart, Reinach, Switzerland

[73] Assignee: Ciba-Geigy Corporation, Tarrytown, N.Y.

[21] Appl. No.: 298,894

[22] Filed: Aug. 31, 1994

Related U.S. Application Data

[62] Division of Ser. No. 129,705, Sep. 30, 1993, Pat. No. 5,371,263.

[30] Foreign Application Priority Data

Oct. 5, 1992 [CH] Switzerland ............................. 3104/92
Nov. 27, 1992 [CH] Switzerland ............................. 3647/92

[51] Int. Cl.$^6$ ................................................ C09K 15/32
[52] U.S. Cl. ............................................................ 558/71
[58] Field of Search ................................................ 558/71

[56] References Cited

U.S. PATENT DOCUMENTS 3,553,298  1/1971  Hodan et al. .
3,787,537  1/1974  De Marcq .
5,342,978  8/1994  Enlow et al. ............................. 554/78

FOREIGN PATENT DOCUMENTS 0143464  6/1985  European Pat. Off. .
0167969  1/1986  European Pat. Off. .
0168721  1/1986  European Pat. Off. .
0278579  8/1988  European Pat. Off. .

*Primary Examiner*—Johann Richter
*Assistant Examiner*—Michael G. Ambrose
*Attorney, Agent, or Firm*—Michele A. Kovaleski

[57] ABSTRACT

The invention relates to a process for stabilizing a crystalline organic phosphite or phosphonite against hydrolysis, which comprises introducing a mixture comprising phosphite or phosphonite, a solvent or solvent mixture, and 0.1 to 100% by weight (relative to phosphite or phosphonite) of an amine and having a temperature of 50°–100° C. as a homogeneous melt into a liquid crystallization medium whose temperature during the addition is maintained 10°–70° C. below the temperature of the melt.

The phosphites or phosphonites stabilized according to the invention are distinguished by their excellent resistance to hydrolysis and have a long shelf life even at high atmospheric humidity. They can be advantageously used as stabilizers for organic material against the damaging effect of heat, oxygen, and/or light.

11 Claims, No Drawings

TRIVALENT PHOSPHORUS COMPOUNDS STABILIZED WITH AMINES

This is a divisional of Ser. No. 08/129,705, filed Sep. 30, 1993, now U.S. Pat. No. 5,371,263.

The invention relates to a process for increasing the shelf life of organic phosphites and phosphonites and to an organic phosphite or phosphonite stabilized against hydrolysis.

Organic phosphites and phosphonites are widely used as heat stabilizers for synthetic polymers. However, preparation, storage and use of phosphites and phosphonites are rendered difficult by the fact that these compounds hydrolyze very easily. A particular problem is storage of the material at high atmospheric humidity.

Various methods have been proposed for arriving at products having improved stability to hydrolysis; these include, apart from preparation processes leading to purer products and methods for purifying the ready-to-use compounds, in particular the addition of specific stabilizers which, on the one hand, reduce the tendency to hydrolysis and, on the other hand, do not result in adverse effects during the later use of the compounds.

EP-A-278 579 proposes to use a hydrolytically stable stabilizer mixture in which the crystalline phosphite is embedded in an amorphous phenolic antioxidant. This stabilizer mixture is obtainable by rapid cooling of a melt of both compounds or of a suspension consisting of crystalline phosphite and liquid phenol derivatives.

The addition of amines as stabilizers against hydrolysis is described, for example, in U.S. Pat. No. 3 553 298. Further publications regarding the stabilization of phosphites with amines are U.S. Pat. No. 3 787 537, EP-A-168 721 and EP-A-167 969. The recommended compounds are in particular tertiary alkanolamines and alkylamines, pyridines and anilines; typical examples are triethylamine, diethanolamine, triethanolamine, di- and triisopropanolamine (TIPA), tetraisopropanolethylenediamine, aniline, phenylenediamine and hexamethylenetetramine. In general, the amines are used in amounts of up to about 5% by weight (relative to the phosphite to be stabilized); incorporation of the amine is effected by dry milling or by dissolution in or mixing with the phosphite melt, followed by crystallization.

Despite the known stabilization methods listed here, there is a need for further improvement of the hydrolyric stability of organic phosphites and phosphonites.

It has now been found that the stabilizing effect of amines can surprisingly be increased by applying the amine in a special process.

Accordingly, the invention provides a process for stabilizing a crystalline organic phosphite or phosphonite against hydrolysis, which comprises introducing a mixture comprising phosphite or phosphonite, a solvent or solvent mixture, and 0.1 to 100% by weight (relative to the phosphite or phosphonite) of an amine and having a temperature of 50°–100° C. as a homogeneous melt into a liquid crystallization medium whose temperature during the addition is maintained 10°–70° C. below the temperature of the melt.

The melt is the liquid mixture comprising amine, solvent and the phosphite or phosphonite to be stabilized. The melt can contain a small or a large amount of solvent, for example 20 or 500% by weight (relative to the phosphite or phosphonite) and thus can also be more like a solution. The important feature is that the melt is homogeneous, i.e. that none of the components mentioned are crystalline any more and separation into 2 or more liquid phases does not take place. The amine used can be an individual compound or a mixture of compounds.

In principle, any organic compounds or mixtures of compounds which are liquid in the temperature range from 10° to 60° C. under atmospheric pressure, do not cause solvolysis and are capable of dissolving a sufficient amount of solid phosphite or phosphonite above 50° C., in some cases up to 100° C. or are sufficiently miscible with the melted phosphite or phosphonite, can be used as the solvent. For example, sufficient solubility or miscibility is given if the homogeneous liquid mixture can contain up to 15, in particular up to 50%, by weight of phosphite or phosphonite. Examples of suitable solvents are alcohols or hydrocarbons or mixtures thereof.

Advantageously one compound or a mixture of two compounds is used as the solvent in the melt. The main solvent is used in an amount of 20 to 500% by weight, relative to the phosphite or phosphonite, and the further solvent in an amount of 0–50% by weight, relative to the main solvent. The melt preferably contains an alcohol or a hydrocarbon as the main solvent in an amount of 20 to 500% by weight, relative to the phosphite or phosphonite, and a further solvent in an amount of 0–50, in particular 0–20, % by weight, relative to the main solvent. It is also possible to use a mixture of alcohols or a mixture of hydrocarbons.

Examples of suitable alcohols are lower alcohols, such as $C_1$–$C_5$alkanols, in particular $C_1$–$C_3$alkanols, such as methanol, ethanol, propanol or isopropanol. Isopropanol and methanol are particularly suitable.

Examples of suitable hydrocarbons are $C_6$–$C_{13}$alkanes, cycloalkanes or alkylated cycloalkanes having 6 to 12 carbon atoms, benzene, or alkylaromatics having 6 to 10 atoms; toluene, ligroin, petroleum ether, xylene, and in particular toluene are particularly suitable.

Frequently the further solvent used is a hydrocarbon or a mixture of hydrocarbons in the case where the main solvent is an alcohol, or an alcohol in the case where the main solvent is a hydrocarbon. Suitable alcohols and hydrocarbons are the ones listed above.

The organic phosphites or phosphonites usable according to the invention are solid at 20° C.; in general they are crystalline solids.

Phosphites are here understood to mean organic phosphites of the formula $P(OR)_3$ in which the radicals R are hydrocarbon radicals, which may contain hetero atoms, and moreover a maximum of two of the three radicals R can be hydrogen atoms. Hetero atoms are any atoms with the exception of carbon and hydrogen, in particular the atoms N, O, F, Si, P, S, Cl, Br, Sn and I.

Phosphonites are esters of phosphonous acid of the formula $P(OR)_2R$ in which R is as defined above or can be halogen.

In the process according to the invention, crude phosphite or crude phosphonite solutions such as are obtained during preparation before crystallization can be used.

The product of the process according to the invention is a mixture of compounds comprising solid phosphite or phosphonite and amine.

The temperature of the melt is preferably 55°–90° C., in particular 60°–80° C.

In the process according to the invention, the difference in temperature between melt and crystallization medium is advantageously at least 20° C., for example 30°–70° C., in particular 40°–60° C.

The crystallization medium is preferably maintained at a temperature being at least 10° C., for example 10°–60° C., below the resulting temperature of the liquidus. The temperature of the crystallization medium is preferably 20°–60° C. below the resulting temperature of the liquidus.

The resulting temperature of the liquidus is the temperature at which a homogeneous phase formed from the melt and crystallization medium is in thermodynamic equilibrium with phosphite crystals; below this temperature, crystallization starts, and above the mixture forms a homogeneous melt. In practice, this temperature is advantageously determined by mixing tests, for example by means of calorimetic (for example by DSC) and/or optical methods.

Advantageously, 80–800% by weight, in particular 100–500% by weight, of organic solvent, relative to the phosphite or phosphonite in the melt, is used as the crystallization medium.

Advantageously, alcohols are used as the crystallization medium; thus, for example, a $C_1$–$C_5$alkanol or a mixture of various $C_1$–$C_5$alkanols is used. $C_1$–$C_3$Alkanols, such as methanol, ethanol, propanol or isopropanol, are preferably used as the crystallization medium.

Advantageously, seed crystals are added to the crystallization medium. Accordingly, the crystallization medium preferably consists of a suspension of 2 to 20% by weight of crystalline phosphite or phosphonite, relative to the phosphite or phosphonite in the melt. Moreover, it is advantageous for the crystallization medium to be 50–100% saturated with the amine, 100% of saturation corresponding to an amine concentration at which dissolved and solid amine can be present side by side.

In general, the melt contains 0.1 to 50% by weight of amine, relative to the phosphite or phosphonite; preferably, 0.2 to 25% by weight, in particular 0.5 to 20% by weight, in particular 1 to 10% by weight, are used (relative to the phosphite or phosphonite in the melt).

During the metered addition of the melt, the crystallization medium is advantageously stirred. After both mixtures have been combined, further workup can take place in a manner known per se, for example by cooling to 10°–15° C. and isolation of the crystalline product.

The stabilized phosphite or phosphonite is generally obtained as a powder in which the amine is homogeneously distributed. Typically it contains 0.01 to 20, in particular 0.05 to 10, in particular 0.1 to 5, % by weight of amine (relative to the phosphite or phosphonite).

The amine used in the process according to the invention is preferably a sterically hindered amine or one of the formula I

in which $X^1$ and $X^2$, independently of one another, are H, $C_1$–$C_2$alkyl, $C_4$–$C_{20}$which is interrupted by one or more —O— and unsubstituted or substituted by one or more hydroxyl groups, or is $C_2$–$C_{20}$hydroxyalkyl, and $X^3$ is $C_2$–$C_{20}$alkyl, $C_4$–$C_{20}$alkyl which is interrupted by one or more —O— and unsubstituted or substituted by one or more hydroxyl groups, or is —(CH$_2$)$_m$—NX$^1$X$^2$, or $C_2$–$C_{20}$hydroxyalkyl, or in which $X^2$ and $X^3$ together are —(CH$_2$)$_m$—, —C$_2$H$_4$—O—C$_2$H$_4$— or —C$_2$H$_4$—NX$^1$C$_2$H$_4$—, m being an integer from the range 4 to 6 and $X^1$ and $X^2$ being as defined above.

The sterically hindered amine is in general a cyclic sterically hindered amine, in particular a compound from the series of polyalkylpiperidine or -piperazine derivatives containing a group of the formulae II or III

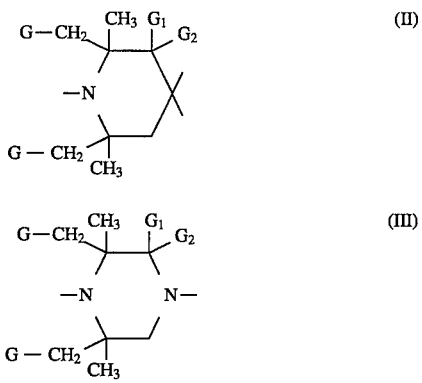

in which G is hydrogen or methyl, and $G_1$ and $G_2$ are hydrogen, methyl or together are =O; preferably, the polyalkylpipefidine group of the formula II or III are substituted in the 4 position by one or two polar substituents or a polar spiro ring system.

$X^1$, $X^2$ and $X^3$ are, for example, independently of one another, ethyl, propyl, butyl, pentyl, hexyl, heptyl, octyl, nonyl, decyl, hydxoxyethyl, hydroxypropyl, hydroxybutyl, hydroxypentyl, hydroxyhexyl, hydroxyheptyl, hydroxyoctyl, hydroxynonyl or hydroxydecyl.

Preferably, $X^1$, $X^2$ and $X^3$ are identical.

The amine of the formula I is preferably a tertiary amine, particularly preferably a tri—$C_2$–$C_4$alkanolamine, in particular triisopropanolamine (=amine A).

Of importance is a process in which the amine used is a tertiary amine of the formula I or a cyclic sterically hindered amine containing at least one group of the formulae II or III in which G is hydrogen, and $G^1$ and $G^2$ are hydrogen or together are a substituent =O.

Particularly advantageously, derivatives of 2,2,6,6-tetramethylpipefidine are used in the process according to the invention.

Of importance is in particular the use of the classes of polyalkylpipefidines described below under (a) to (h), which carry a group of the formula II or III as mentioned above:

(a) compounds of the formula IV

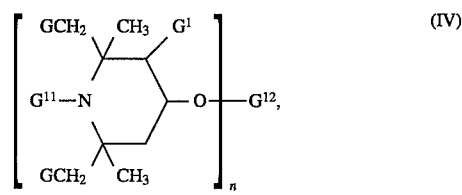

in which n is a number from 1 to 4, G and $G^1$, independently of one another, are hydrogen or methyl, $G^{11}$ is hydrogen, oxyl, hydroxyl, $C_1$–$C_{18}$alkyl, $C_3$–$C_8$alkenyl, $C_3$–$C_8$alkynyl, $C_7$–$C_{12}$aralkyl, $C_1$–$C_{18}$alkoxy, $C_4$–$C_8$cycloalkoxy, $C_6$–$C_9$phenylalkoxy, $C_1$–$C_8$alkanoyl, $C_3$–$C_5$alkenoyl, $C_1$–$C_{18}$alkanoyloxy, benzyloxy, glycidyl or a group —CH$_2$CH(OH)—Z, in which Z is hydrogen, methyl or phenyl, $G^{11}$ being preferably H, $C_1$–$C_4$alkyl, allyl, benzyl, acetyl or acryloyl and $G^{12}$ being, in the case where n is 1, hydrogen, $C_1$–$C_{18}$alkyl which may be interrupted by one or more oxygen atoms, cyanoethyl, benzyl, glycidyl, a monovalent radical of an aliphatic, cycloaliphatic, aralphatic, unsaturated or aromatic carboxylic acid, carbamic acid or phosphorus-containing acid or a monovalent silyl radical, preferably a radical of an aliphatic carboxylic acid having 2 to 18 C atoms, a cycloaliphatic carboxylic acid having 7 to 15 C atoms, an α, β-unsaturated carboxylic acid having 3 to 5 C atoms or an aromatic carboxylic acid having 7 to 15 C atoms it being possible for the carboxylic acid to be substituted in each case in the aliphatic, cycloaliphatic or aromatic portion by 1 to 3 groups —COOZ$^{12}$, in which Z$^{12}$ is H, C$_1$–C$_{20}$alkyl, C$_3$–C$_{12}$alkenyl, C$_5$–C$_7$cycloalkyl, phenyl or benzyl, in the case where n is 2, C$_2$–C$_{12}$alkylene, C$_4$–C$_{12}$alkenylene, xylylene, a divalent radical of an aliphatic, cycloaliphatic, araliphatic or aromatic dicarboxylic acid, dicarbamic acid or phosphorus-containing acid, or a divalent silyl radical, preferably a radical of an aliphatic dicarboxylic acid having 2 to 36 C atoms, a cycloaliphatic or aromatic dicarboxylic acid having 8–14 C atoms, or an aliphatic, cycloaliphatic or aromatic dicarbamic acid having 8–14 C atoms, it being possible for the dicarboxylic acid to be substituted in each case in the aliphatic, cycloaliphatic or aromatic portion by 1 or 2 groups —COOZ$^{12}$, in the case where n is 3, a trivalent radical of an aliphatic, cycloaliphatic or aromatic tricarboxylic acid, which may be substituted in the aliphatic, cycloaliphatic or aromatic portion by —COOZ$^{12}$, an aromatic tricarbamic acid or a phosphorus-containing acid, or a trivalent silyl radical, and in the case where n is 4, a tetravalent radical of an aliphatic, cycloaliphatic or aromatic tetracarboxylic acid.

The carboxylic acid radicals mentioned include in each case radicals of the formula (—CO)$_n$R, the meaning of n being given above and the meaning of R being apparent from the definition given.

Examples of C$_1$–C$_{12}$alkyl substituents, if present, are methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of G$^{11}$ or G$^{12}$ as C$_1$–C$_{18}$alkyl can be the abovementioned groups and in addition, for example, n-tridecyl, n-tetradecyl, n-hexadecyl or n-octadecyl.

Examples of G$^{11}$ as C$_3$–C$_8$alkenyl can be 1-propenyol, allyl, methallyl, 2-butenyl, 2-pentenyl, 2-hexenyl, 2-octenyl, 4-ten-butyl-2-butenyl.

G$^{11}$ as C$_3$–C$_8$alkynyl is preferably propargyl.

G$^{11}$ as C$_7$–C$_{12}$aralkyl is in particular phenethyl and especially benzyl.

Examples of G$^{11}$ as C$_1$–C$_8$alkanoyl are formyl, propionyl, butyryl, octanoyl, but preferably acetyl and as C$_3$–C$_5$alkenoyl in particular acryloyl.

G$^{12}$ as a monovalent radical of a carboxylic acid is, for example, an acetic acid, caproic acid, stearic acid, acrylic acid, methacrylic acid, benzoic acid or β-(3,5-di-tert-butyl-4-hydroxyphenyl)propionic acid radical.

G$^{12}$ as a monovalent silyl radical is, for example, a radical of the formula —(C$_j$H$_{2j}$)—Si(Z')$_2$Z", in which j is an integer from the range 2 to 5, and Z' and Z", independently of one another, are C$_1$–C$_4$alkyl or C$_1$–C$_4$alkoxy.

G$^{12}$ as a divalent radical of a dicarboxylic acid is, for example, a malonic acid, succinic acid, glutaric acid, adipic acid, suberic acid, sebacic acid, maleic acid, iraconic acid, phthalic acid, dibutylmalonic acid, dibenzylmalonic acid, butyl(3,5-di-tert-butyl-4-hydroxybenzyl)malonic acid or bicycloheptenedicarboxylic acid radical.

G$^{12}$ as a trivalent radical of a tricarboxylic acid is, for example, a trimellific acid, citric acid or nitrilotriacetic acid radical.

G$^{12}$ as a tetravalent radical of a tetracarboxylic acid is, for example, the tetravalent radical of butane-1,2,3,4-tetracarboxylic acid or of pyromellitic acid.

G$^{12}$ as a divalent radical of a dicarbamic acid is, for example, a hexamethylenedicarbamic acid or a 2,4-toluylenedicarbamic acid radical.

Preference is given to compounds of the formula IV in which G is hydrogen, G$^{11}$ is hydrogen or methyl, n is 2, and G$^{12}$ is the diacyl radical of an aliphatic dicarboxylic acid having 4–12 C atoms.

Examples of polyalkylpiperidine compounds from this class are the following compounds:

1) 4-hydroxy-2,2,6,6-tetramethylpiperidine
2) 1-allyl-4-hydroxy-2,2,6,6-tetramethylpiperidine
3) 1-benzyl-4-hydroxy-2,2,6,6-tetramethylpiperidine
4) 1-(4-tert-butyl-2-butenyl)-4-hydroxy-2,2,6,6-tetramethylpiperidine
5) 4-stearoyloxy-2,2,6,6-tetramethylpiperidine
6) 1-ethyl-4-salicyloyloxy-2,2,6,6-tetramethylpiperidine
7) 4-methacryloyloxy-1,2,2,6,6-pentamethylpiperidine
8) 1,2,2,6,6-pentamethylpiperidin-4-yl β-(3,5-di-ten-butyl-4-hydroxyphenyl)propionate
9) di(1-benzyl-2,2,6,6-tetramethylpiperidin-4-yl)maleate
10) di(2,2,6,6-tetramethylpiperidin-4-yl) succinate
11) di(2,2,6,6-tetramethylpiperidin-4-yl) glutarate
12) di(2,2,6,6-tetramethylpiperidin-4-yl) adipate
13) di(2,2,6,6-tetramethylpiperidin-4-yl) sebacate
14) di(1,2,2,6,6-pentamethylpiperidin-4-yl) sebacate
15) di(1,2,3,6-tetramethyl-2,6-diethyl-piperidin-4-yl) sebacate
16) di(1-allyl-2,2,6,6-tetramethylpiperidin-4-yl) phthalate
17) 1-hydroxy-4-β-cyanoethyloxy-2,2,6,6-tetramethylpiperidine
18) 1-acetyl-2,2,6,6-tetramethylpiperidin-4-yl acetate
19) trimellitic acid tri-(2,2,6,6-tetramethylpiperidin-4-yl)ester
20) 1-acryloyl-4-benzyloxy-2,2,6,6-tetramethylpiperidine
21) di(2,2,6,6-tetramethylpiperidin-4-yl) diethylmalonate
22) di-(1,2,2,6,6-pentamethylpiperidin-4-yl) dibutylmalonate
23) di(1,2,2,6,6-pentamethylpiperidin-4-yl) butyl(3,5-di-tert-butyl-4-hydroxybenzyl)malonate
24) di(1-octyloxy-2,2,6,6-tetramethylpiperidin-4-yl) sebacate
25) di(1-cyclohexyloxy-2,2,6,6-tetramethylpiperidin-4-yl) sebacate
26) hexane-1', 6'-bis(4-carbamoyloxy-1-n-butyl-2,2,6,6-tetramethyl-piperidine)
27) toluene-2', 4'-bis(4-carbamoyloxy-1-n-propyl-2,2,6,6-tetramethyl-piperidine)
28) dimethylbis(2,2,6,6-tetramethylpiperidine-4-oxy)silane
29) phenyltris(2,2,6,6-tetramethylpiperidine-4-oxy)silane
30) tris(1-propyl-2,2,6,6-tetramethylpiperidin-4-yl) phosphite
31) tris(1-propyl-2,2,6,6-tetramethylpiperidin-4-yl) phosphate
32) bis-(1,2,2,6,6-pentamethylpiperidin-4-yl) phenylphosphonate
33) 4-hydroxy-1,2,2,6,6-pentamethylpiperidine
34) 4-hydroxy-N-hydroxyethyl-2,2,6,6-tetramethylpiperidine
35) 4-hydroxy-N-(2-hydroxypropyl)-2,2,6,6-tetramethylpiperidine
36) 1-glycidyl-4-hydroxy-2,2,6,6-tetramethylpiperidine (b) compounds of the formula (V)

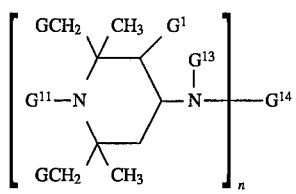

in which n is 1 or 2, G, $G^1$ and $G^{11}$ have the meaning given under (a), $G^{13}$ is hydrogen, $C_1$–$C_{12}$alkyl, $C_2$–$C_5$aydroxyalkyl, $C_5$–$C_7$cycloalkyl, $C_7$–$C_8$aralkyl, $C_2$–$C_{18}$alkanoyl, $C_3$–$C_5$alkenoyl, benzoyl or a group of the formula

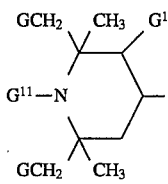

and $G^{14}$ is, in the case where n is 1, hydrogen, $C_1$–$C_{18}$alkyl, $C_3$–$C_8$alkenyl, $C_5$–$C_7$cycloalkyl, $C_1$–$C_4$alkyl which is substituted by a hydroxyl, cyano, alkoxycarbonyl or carbamide group, or is glycidyl, a group of the formula —CH$_2$—CH(OH)—Z or of the formula —CONH—Z, in which Z is hydrogen, methyl or phenyl;

in the case where n is 2, $C_2$–$C_{12}$alkylene, $C_6$–$C_{12}$arylene, xylylene, a —CH$_2$—CH(OH)—CH$_2$— or a group —CH$_2$—CH(OH)—CH$_2$—O—D—O—, in which D is $C_2$–$C_{10}$alkylene, $C_6$–$C_{15}$arylene, $C_6$–$C_{12}$cycloalkylene, or, provided $G^{13}$ is not alkanoyl, alkenoyl or benzoyl, $G^{14}$ can also be 1—oxo—$C_2$–$C_{12}$alkylene, a divalent radical of an aliphatic, cycloaliphatic or aromatic dicarboxylic acid or dicarbamic acid or else the group —CO—, or, in the case where n is 1, $G^{13}$ and $G^{14}$ together can be the divalent radical of an aliphatic, cycloaliphatic or aromatic 1,2- or 1,3-dicarboxylic acid.

$C_1$–$C_{12}$Alkyl or $C_1$–$C_{18}$alkyl substituents, if present, have the meaning already given under (a).

$C_5$–$C_7$Cycloalkyl substitutents, if present, are in particular cyclohexyl.

$G^{13}$ as $C_7$–$C_8$aralkyl is in particular phenylethyl or especially benzyl. $G^{13}$ as $C_2$–$C_5$hydroxyalkyl is in particular 2-hydroxyethyl or 2-hydroxypropyl.

Examples of $G^{13}$ as $C_2$–$C_{18}$alkanoyl are propionyl, butyryl, octanoyl, dodecanoyl, hexadecanoyl, octadecanoyl, but preferably acetyl and, as $C_3$–$C_5$alkenoyl, in particular acryloyl.

Examples of $G^{14}$ as $C_2$–$C_8$alkenyl are allyl, methallyl, 2-butenyl, 2-pentenyl, 2-hexenyl or 2-octenyl.

Examples of $G^{14}$ as $C_1$–$C_4$alkyl which is substituted by a hydroxyl, cyano, alkoxycarbonyl or carbamic group can be 2-hydroxyethyl, 2-hydroxypropyl, 2-cyanoethyl, methoxycarbonylmethyl, 2-ethoxycarbonylethyl, 2-aminocarbonylpropyl or 2-(dimethylaminocarbonyl)ethyl.

Examples of $C_2$–$C_{12}$alkylene substituents, if present, are ethylene, propylene, 2,2-dimethylpropylene, tetramethylene, hexamethylene, octamethylene, decamethylene or dodecamethylen.

Examples of $C_6$–$C_{15}$arylene substituents, if present are o-, m- or p-phenylene, 1,4-naphthylene or 4,4'-diphenylene.

A $C_6$–$C_{12}$cycloalkylene is in particular cyclohexylene.

Preference is given to compounds of the formula V in which n is 1 or 2, G is hydrogen, $G^{11}$ is hydrogen or methyl, $G^{13}$ is hydrogen, $C_1$–$C_{12}$alkyl or a group of the formula

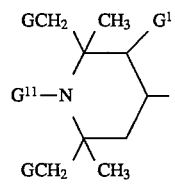

and $G^{14}$ is hydrogen or $C_1$–$C_{12}$alkyl in the case where n=1 and $C_2$–$C_8$alkylene or 1—oxo—$C_2$–$C_8$alkylene in the case where n is 2.

Examples of polyalkylpiperidine compounds of this class are the following compounds:

37) N,N'-bis(2,2,6,6-tetramethylpiperidin-4-yl)hexamethylene-1,6-diamine
38) N,N'-bis(2,2,6,6-tetramethylpipefidin4-yl)hexamethylene-1,6-diacetamide
39) bis(2,2,6,6-tetramethylpiperidin-4-yl)amine
40) 4-benzoylamino-2,2,6,6-tetramethylpiperidine
41) N,N'-bis(2,2,6,6-tetramethylpiperidin4-yl)-N,N'4ibutyladipamide
42) N,N'-bis(2,2,6,6-tetramethylpiperidin-4-yl)-N,N'-dicyclohexyl-2-hydroxypropylene1,3-diamine
43) N,N'-bis(2,2,6,6-tetramethylpiperidin-4-yl)-p-xylylene diamine
44) N,N'-bis(2,2,6,6-tetramethylpipefidin4-yl)succinediamide
45) di(2,2,6,6-tetramethylpipefidin-4-yl) N-(2,2,6,6-tetramethylpipefidin4-yl)-Baminodipropionate aminodipropionate
46) the compound of the formula

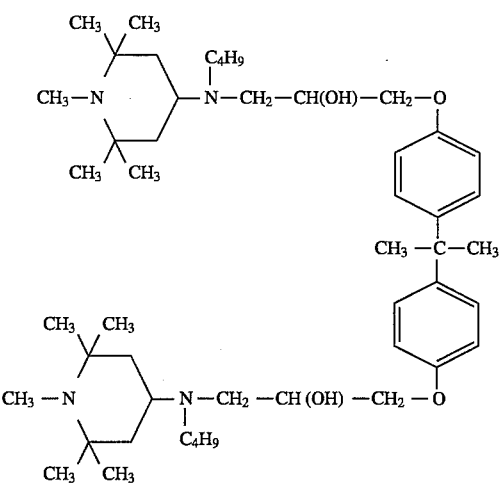

47) 4-[bis(2-hydroxyethyl)amino]-1,2,2,6,6-pentamethylpiperidine
48) 4-(3-methyl-4-hydroxy-5-ten-butylbenzamido)-2,2,6,6-tetramethylpiperidine 49) 4-methacrylamido-1,2,2,6,6-pentamethylpiperidine (c) compounds of the formula (VI)

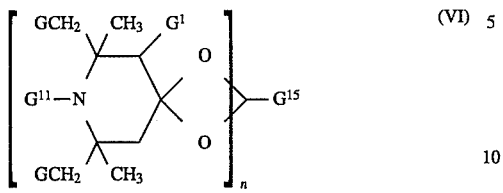

in which n is 1 or 2, G, $G^1$ and $G^{11}$ have the meaning given under (a), and $G^{15}$ is $C_2$–$C_8$alkylene or -hydroxyalkylene or $C_4$–$C_{22}$acyloxyalkylene, in the case where n is 1, and is the group (—$CH_2$)$_2$C($CH_2$—)$_2$, in the case where n is 2.

Examples of $G^{15}$ as $C_2$–$C_8$alkylene or -hydroxyalkylene are ethylene, 1-methylethylene, propylene, 2oethylpropylene or 2-ethyl-2-hydroxymethylpropylene.

$G^{15}$ as $C_4$–$C_{22}$acyloxyalkylene is, for example, 2-ethyl-2-acetoxymethylpropylene.

Examples of polyalkylpiperidine of this class axe the following compounds:

50) 9-aza-8,8,10,10-tetramethyl-1,5-dioxaspiro[5.5]undecane
51) 9-aza-8,8,10,10-tetramethyl-3-ethyl-1,5-dioxaspiro[5.5]undecane
52) 8-aza-2,7,7,8,9,9-hexamethyl-1,4-dioxaspiro[4.5]decane
53) 9-aza-3-hydroxymethyl-3-ethyl-8,8,9,10,10-pentamethyl-1,5-dioxaspiro[5.5]undecane
54) 9-aza-3-ethyl-3-acetoxymethyl-9-acetyl-8,8,10,10-tetramethyl-1,5-dioxaspiro[5.5]-undecane
55) 2,2,6,6-tetramethylpiperidine-4-spiro-2'-(1',3'-dioxane)-5'-spiro-5''-(1'',3''-dioxane)-2''-spiro-4'''-(2''',2''',6''',6'''-tetramethylpiperidine ).

(d) Compounds of the formulae VIIAt, VIIB and VIIC, preference being given to compounds of the formula VIIC

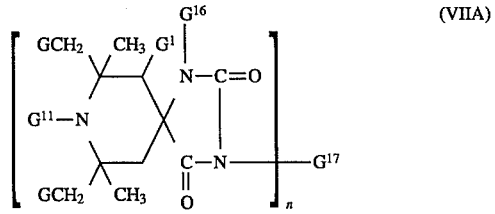

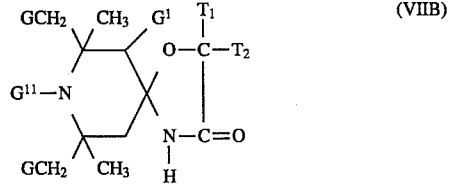

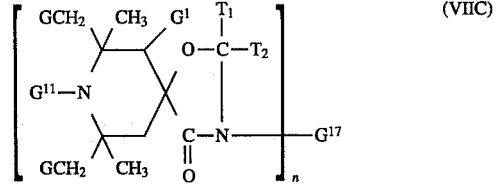

in which n is 1 or 2, G, $G^1$ and $G^{11}$ have the meaning given under (a), $G^{16}$ is hydrogen, $C_1$–$C_{11}$alkyl, allyl, benzyl, glycidyl or $C_2$–$C_6$alkoxyalkyl and $G^{17}$ is, in the case where n is 1, hydrogen, $C_1$–$C_{12}$alkyl, $C_3$–$C_5$alkenyl, $C_7$–$C_9$aralkyl, $C_5$–$C_7$cycloalkyl, $C_2$–$C_4$hydroxyalkyl, $C_2$–$C6$alkoxyalkyl, $C_6$–$C_{10}$aryl, glycidyl or a group of the formula —($CH_2$)p—COO-Q or of the formula —($CH_2$)p-O—CO—Q, in which p is 1 or 2 and Q is $C_1$–$C_4$alkyl or phenyl, and, in the case where n is 2, $C_2$–$C_{12}$alkylene, $C_4$–$C_{12}$alkenylene, $C_6$–$C_{12}$ arylene, a group —$CH_2$—CH(OH)—$CH_2$—O—D—O—$CH_2$CH(OH)—$CH_2$—, in which D is $C_2$–$C_{10}$alkylene, $C_6$–$C_{15}$arylene, $C_6$–$C_{12}$cycloalkylene, or a group —$CH_2$CH(OZ')$CH_2$—(O$CH_2$—CH(OZ')$CH_2$)$_2$—, in which Z' is hydrogen, $C_1$–$C_{18}$alkyl, allyl, benzyl, $C_2$–$C_{12}$alkanoyl or benzoyl, $T_1$ and $T_2$, independently of one another, are hydrogen, $C_1$–$C_{18}$alkyl or unsubstituted or halogen- or $C_1$–$C_4$alkyl-substituted $C_6$–$C_{10}$aryl or $C_7$–$C_9$aralkyl, or $T_1$ and $T_2$ together with the C atom linking them form a $C_5$–$C_{14}$cycloalkane ring.

Examples of $C_1$–$C_{12}$alkyl substituents, if present, are methyl, ethyl, n-propyl, n-butyl, sec-butyl, tert-butyl, n-hexyl, n-octyl, 2-ethylhexyl, n-nonyl, n-decyl, n-undecyl or n-dodecyl.

Examples of $C_1$–$C_{18}$alkyl substituents, if present, can be the abovementioned groups and in addition, for example, n-tridecyl, n-tetradecyl, n-hexadecyl or n-octadecyl.

Examples of $C_2$–$C_6$alkoxyalkyl substituents, if present, are methoxymethyl, ethoxymethyl, propoxymethyl, tert-butoxymethyl, ethoxyethyl, ethoxypropyl, n-butoxyethyl, tert-butoxyethyl, isopropoxyethyl or propoxypropyl.

Examples of $G^{17}$ as $C_3$–$C_5$alkenyl are 1-propenyl, allyl, methallyl, 2-butenyl or 2-pentenyl.

$G^{17}$, $T_1$ and $T_2$ as $C_7$–$C_9$aralkyl are in particular phenethyl or especially benzyl. A cycloalkane ring formed by $T_1$ and $T_2$ together with the C atom can be, for example, a cyclopentane, cyclohexane, cyclooctane or cyclododecane ring.

Examples of $G^{17}$ as $C_2$–$C_4$hydroxyalkyl are 2-hydroxyethyl, 2-hydroxypropyl, 2-hydroxybutyl or 4-hydroxybutyl.

$G^{17}$, $T_1$ and $T_2$ as $C_6$–$C_{10}$aryl are in particular phenyl, α- or β-naphthyl, which are unsubstituted or substituted by halogen or $C_1$–$C_4$alkyl.

Examples of $G^{17}$ as $C_2$–$C_{12}$alkylene are ethylene, propylene, 2,2-dimethylpropylene, tetramethylene, hexamethylene, octamethylene, decamethylene or dodecamethylene.

$G^{17}$ as $C_4$–$C_{12}$alkenylene is in particular 2-butenylene, 2-pentenylene or 3-hexenylene.

Examples of $G^{17}$ as $C_6$–$C_{12}$arylene are o-, m- or p-phenylene, 1,4-naphthylene or 4,4'-diphenylene.

Examples of Z' as $C_2$–$C_{12}$alkanoyl are propionyl, butyryl, octanoyl, dodecanoyl, but preferably acetyl.

D as $C_2$–$C_{10}$alkylene, $C_6$–$C_{15}$arylene or $C_6$–$C_{12}$cycloalkylene is as defined under (b).

Examples of polyalkylpiperidine compounds of this class are the following compounds:

56) 3-benzyl-1,3,8-triaza-7,7,9,9-tetramethylspiro[4.5]decane-2,4-dione
57) 3-n-octyl-1,3,8-triaza-7,7,9,9-tetramethylspiro[4.5]decane-2,4-dione
58) 3-allyl-1,3,8-triaza-1,7,7,9,9-pentamethylspiro[4.5]decane-2,4-dione
59) 3-glycidyl-1,3,8-triaza-7,7,8,9,9-pentamethylspiro[4.5]decane-2,4-dione
60) 1,3,7,7,8,9,9-heptamethyl-1,3,8-triazaspiro[4.5]decane-2,4-dione
61) 2-isopropyl-7,7,9,9-tetramethyl-1-oxa-3,8-diaza-4-oxospiro-[4.5]decane 62) 2,2-dibutyl-7,7,9,9-tetramethyl-1-oxa-3,8-diaza-4-ox-ospiro-[4.5]-decane
63) 2,2,4,4-tetramethyl-7-oxa-3,20-diaza-21 -oxodispiro [5.1.11.2 ]-heneicosane
64) 2-butyl-7,7,9,9-tetramethyl-1 -oxa-4,8-diaza-3-oxospiro [4.5]decane and preferably:
65) 8-acetyl-3-dodecyl-1,3,8-triaza-7,7,9,9-tetramethylspiro [4.5]-decane-2,4-dione or the compounds of the following formulae:

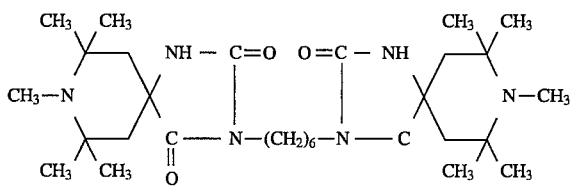  66)

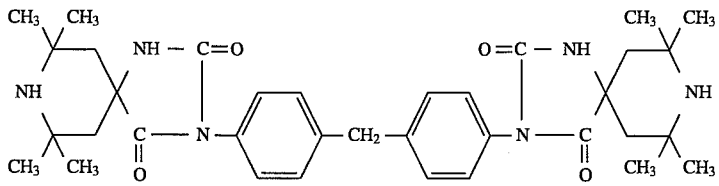  67)

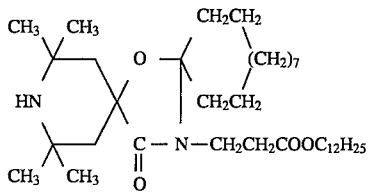  68)

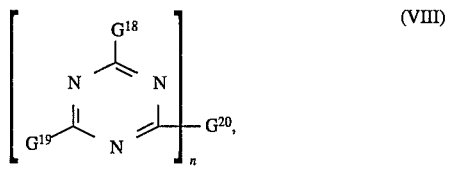  69)

(e) Compounds of the formula VIII, which on their part are preferred,

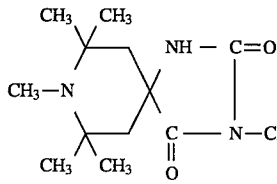 (VIII)

in which n is 1 or 2 and $G^{18}$ is a group of one of the formulae

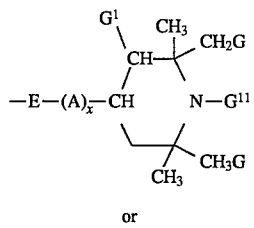

or

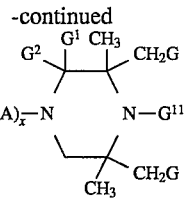

in which G and $G^{11}$ are as defined under (a) and $G^1$ and $G^2$ are hydrogen, methyl or together are a substiment =O, E is —O— or —$NG^{13}$—,
A is $C_2$–$C_6$alkylene or —$(CH_2)_3$—O— and
x is 0 or 1,
$G^{13}$ is hydrogen, $C_1$–$C_{12}$alkyl, $C_2$–$C_5$hydroxyalkyl or $C_5$–$C_7$cycloalkyl,
$G^{19}$ is identical to $G^{18}$ or one of the groups —$NG^{21}G_{22}$, —$OG^{23}$, —$NHCH_2OG^{23}$ or —$N(CH_2OG^{23})_2$,
$G^{20}$ is identical to $G^{18}$ or $G^{19}$ in the case where n is 1, and is a group —E—B—E—, in which B is $C_2$–$C_8$alkylene or $C_2$–$C_8$alkylene which is interrupted by 1 or 2 —$N(G^{21})$— groups, in the case where n is 2,
$G^{21}$ is $C_1$–$C_{12}$alkyl, cyclohexyl, benzyl, $C_1$–$C_4$hydroxyalkyl or a group of the formula

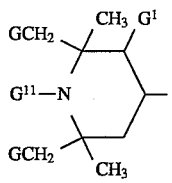

$G^{22}$ is $C_1$–$C_{12}$alkyl, cyclohexyl, benzyl, $C_1$–$C_4$hydroxyalkyl, and $G^{23}$ is hydrogen, $C_1$–$C_{12}$alkyl or phenyl, or $G^{21}$ and $G^{22}$ together are $C_4$–$C_5$alkylene or —oxaalkylene, for example

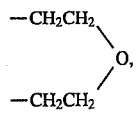

or a group of the formula

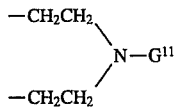

is a group fo the formula

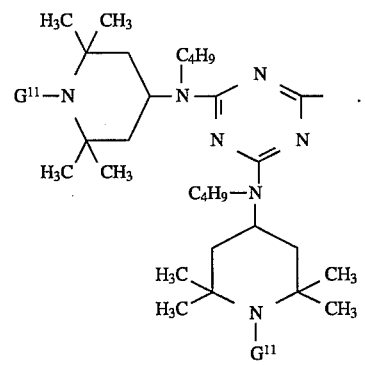

Any $C_1$–$C_{12}$alkyl substituents present are, for example, methyl, ethyl, n-propyl, n-butyl, sec-butyl, tert-butyl, n-hexyl, n-octyl, 2-ethylhexyl, n-nonyl, n-decyl, n-undecyl or n-dodecyl.

Any $C_1$–$C_4$hydroxyalkyl substituents present are, for example, 2-hydroxyethyl, 2-hydroxypropyl, 3-hydroxypropyl, 2-hydroxybutyl or 4-hydroxybutyl.

Examples of A as $C_2$–$C_6$alkylene are ethylene, propylene, 2,2-dimethylpropylene, tetramethylene or hexamethylene.

Examples of $G^{21}$ and $G^{22}$ together as $C_4$–$C_5$alkylene or oxaalkylene are tetramethylene, pentamethylene or 3-oxapentamethylene.

Examples of polyalkylpiperidine compounds of this class are the compounds of the following formulae:

70)

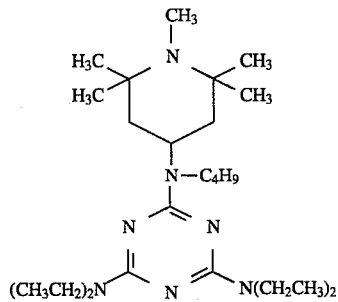

71)

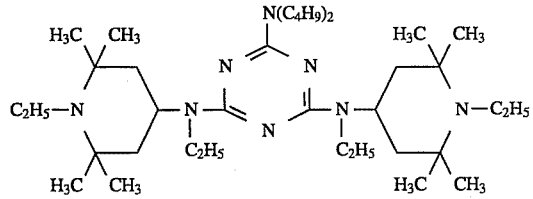

72)

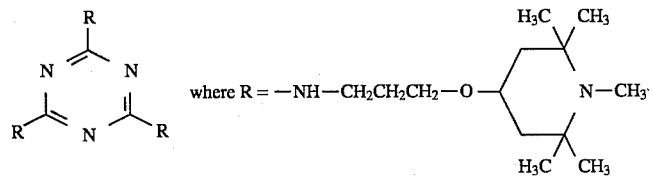

73)
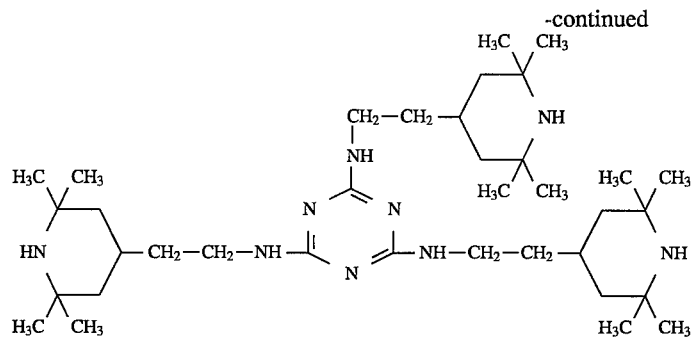
74)
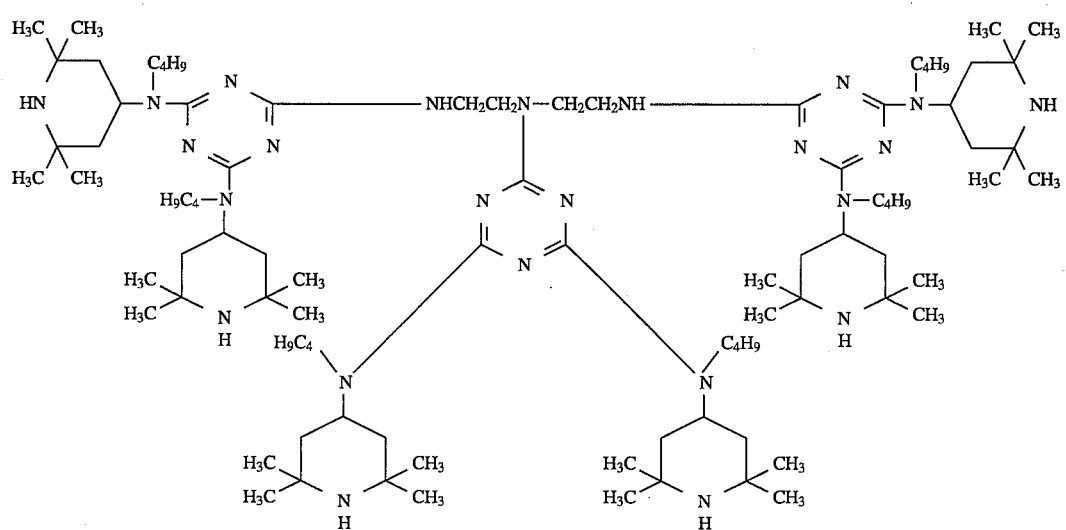
75)
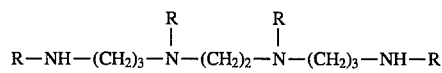
where R is
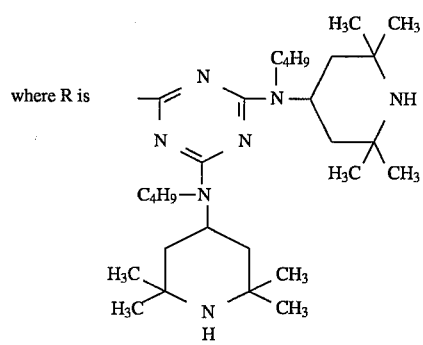
76)
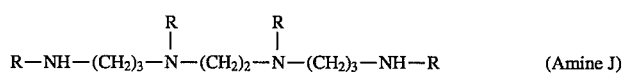     (Amine J)
where R is
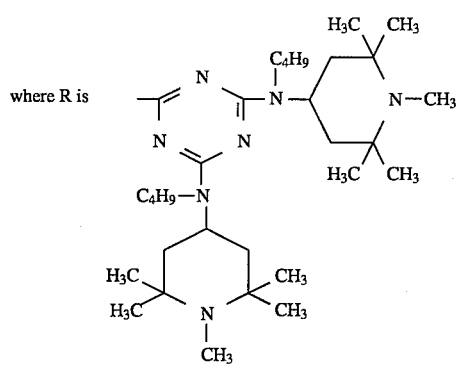

77)
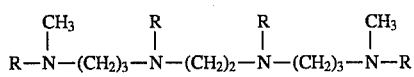
where R is
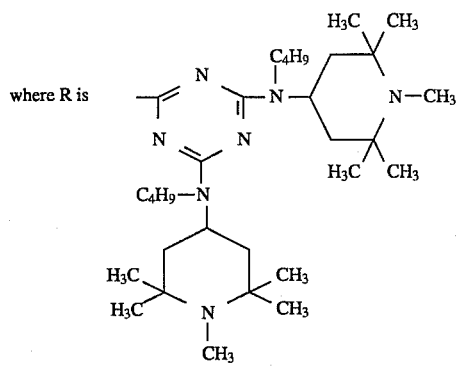
78)
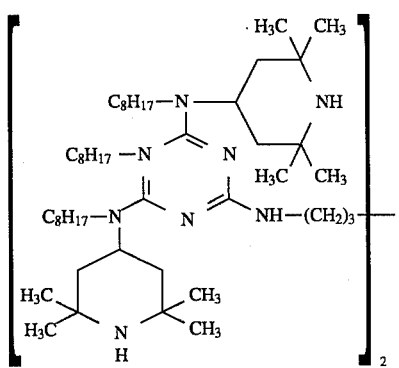
79)
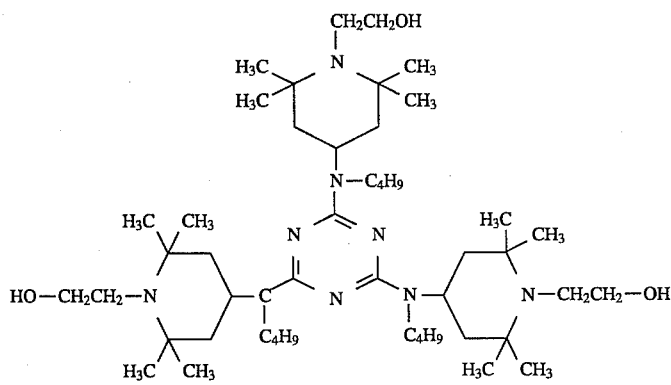
80)
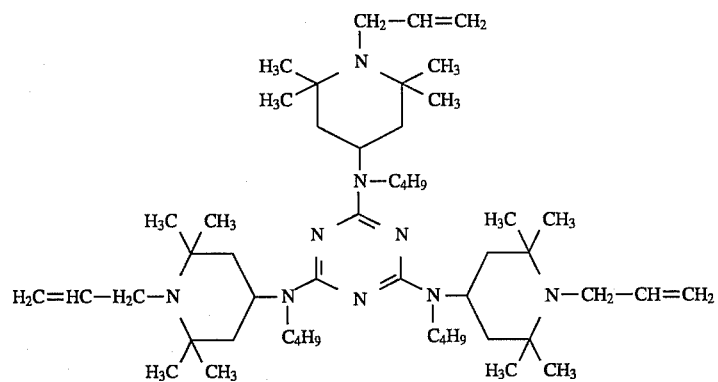
(f) oligomers or polymer compounds whose recurring structural unit contains a 2,2,6,6-tetraalkylpiperidine radical of the formula III, in particular polyesters, polyethers, polyamides, polyamines, polyurethanes, polyureas, polyaminotriazines, poly(meth)acrylates, poly(meth)acrylamides and copolymers thereof containing such radicals.

Examples of 2,2,6,6-polyalkylpiperidine light stabilizers of this class are the compounds of the following formulae, m being a number from 2 to about 200.
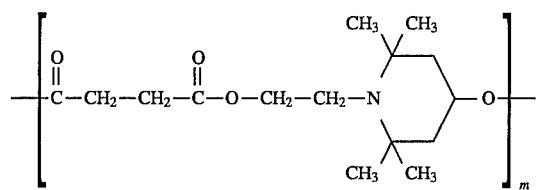
81)
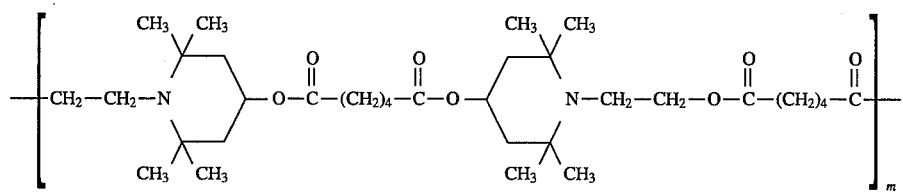
82)
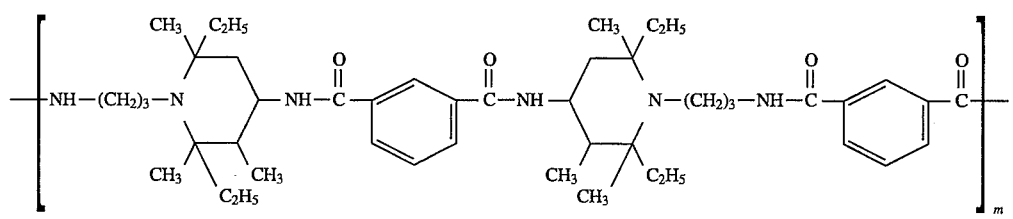
83)
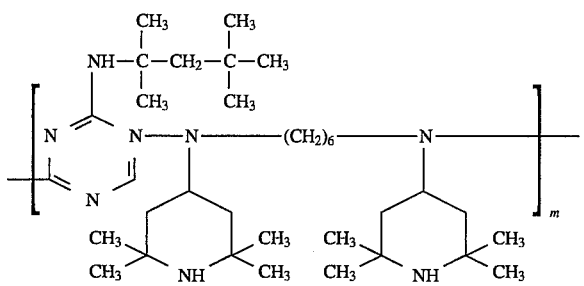
84)
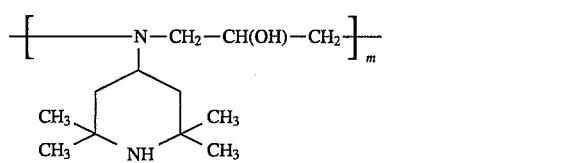
85)
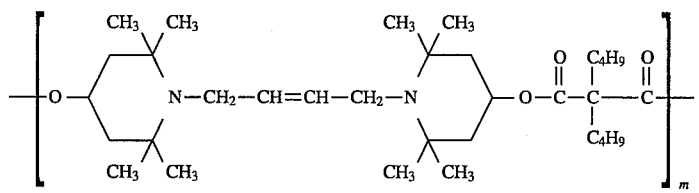
86)
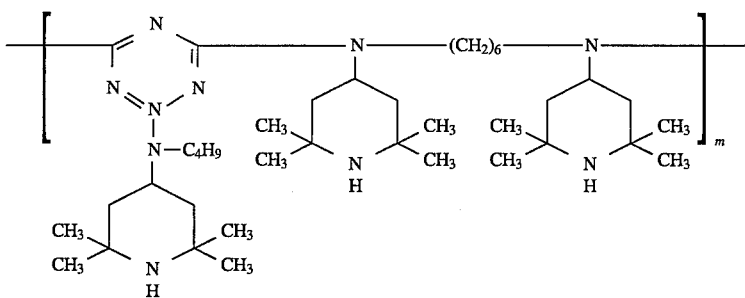
87)

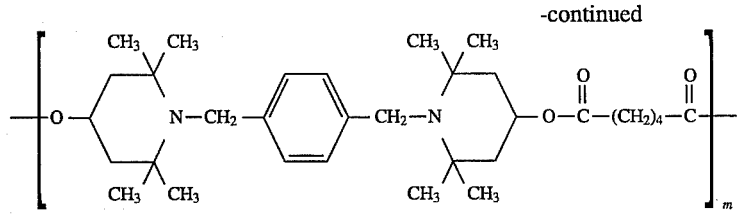
88)
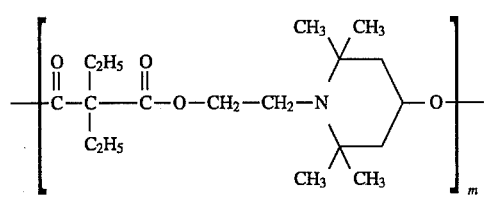
89)
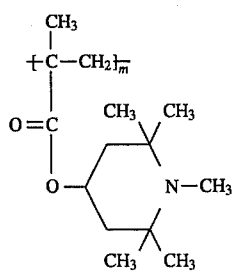
90)
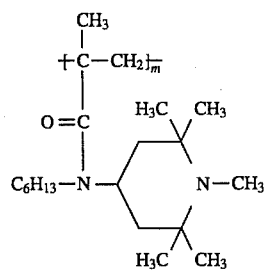
91)
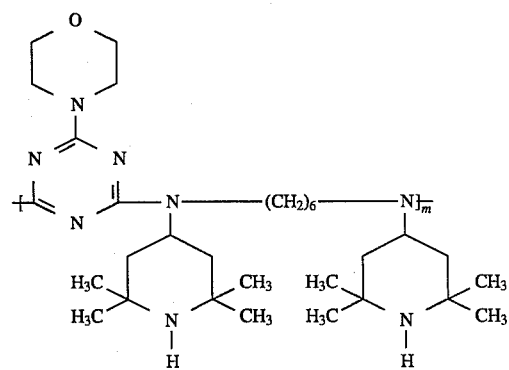
92)
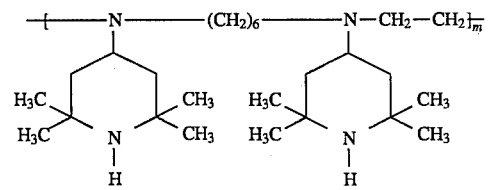
93)
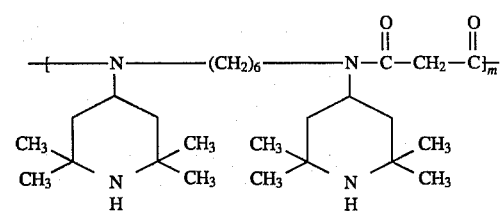
94)

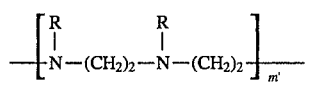

R being

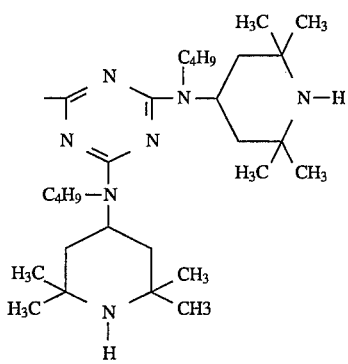

or a branching of the chain

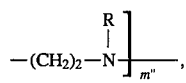

m' and m" are each an integer from the range 0–200 on condition that m'+m" is m.

Further examples of polymer light stabilizers are reaction products of compounds of the formula

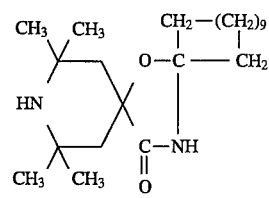

with epichlorohydrin;

polyesters obtained by reaction of butane-1,2,3,4-tetra-carboxylic acid with a bifunctional alcohol of the formula

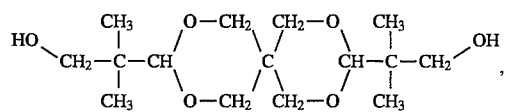

the carboxyl side chains of which originating from the tetracarboxylic acid have been esterified with 2,2,6,6-tetramethyl-4-hydroxypiperidine;

compounds of the formula

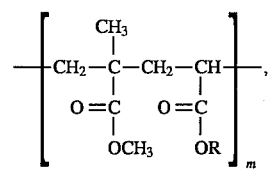

in which about one third of the radicals R are —$C_2H_5$ and the others are,

95)

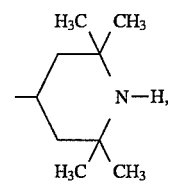

and m is a number from the range 2 to 200; or copolymers whose recurring unit is composed of 2 units

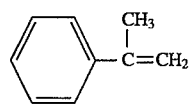

and 1 unit of each

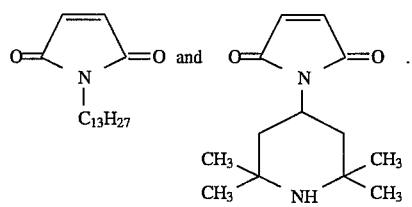

(g) Compounds of the formula IX

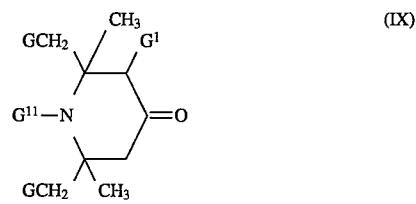

in which G, $G^1$ and $G^{11}$ are as defined under (a).

Preference is given to compounds of the formula IX in which G is hydrogen or methyl and $G^{11}$ is hydrogen or methyl.

Examples of such compounds are:

96) 2,2,6,6-tetramethyl-4-piperidone (triacetoneamine)
97) 1,2,2,6,6-pentamethyl-4-piperidone
98) 2,2,6,6-tetramethyl-4-piperidone 1-oxide
99) 2,3,6-trimethyl-2,6-diethyl-4-piperidone (h) compounds of the formula X

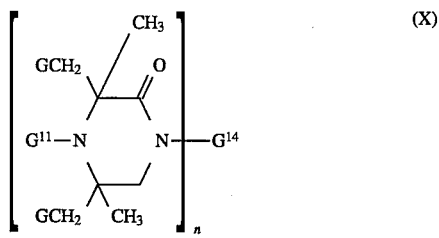

in which n is 1 or 2 and in which G and $G^{11}$ are as defined under (a) and $G^{14}$ is as defined under (b), the meanings —CONH—Z and —CH$_2$—CH(OH)—CH$_2$—O—D—O— being excluded for G$^{14}$.

Examples of such compounds are:

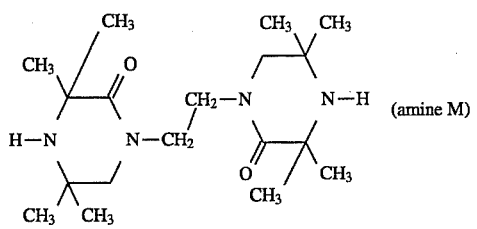

100) (amine M)

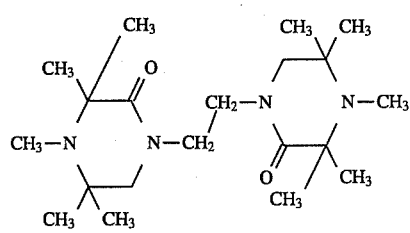

101)

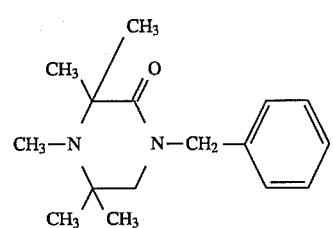

102)

The following amines are particularly preferred for use in the process according to the invention:

Compounds of the formula IV in which n is an integer from the range 1 to 4, G and G$^1$ are hydrogen, and G$^{11}$ is hydrogen or C$_1$–C$_{18}$alkyl, and G$^{12}$, in the case where n is 1, is a radical of the formula —(C$_j$H$_{2j}$)—Si(Z')$_2$Z'', in which j is an integer from the range 2 to 5 and Z' and Z'', independently of one another, are C$_1$–C$_4$alkyl or C$_1$–C$_4$alkoxy, and G$^{12}$, in the case where n is 2, is a radical of an aliphatic dicarboxylic acid having 2 to 12 C atoms which may be substituted by —COOZ$^{12}$, Z$^2$ being C$_1$–C$_{20}$alkyl, G$^{12}$, in the case where n is 3, is a radical of an aromatic tricarboxylic acid having 9 to 15 C atoms, G$^{12}$, in the case where n is 4, is a radical of an aliphatic tetracarboxylic acid having 8 to 12 C atoms; amines from this class which are of particular technical interest are those of the formulae

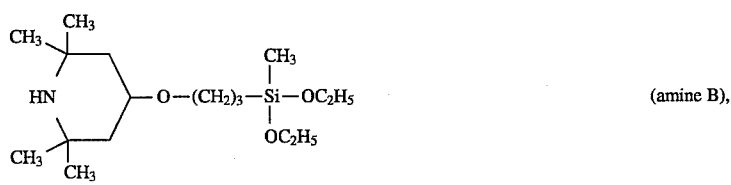

(amine B),

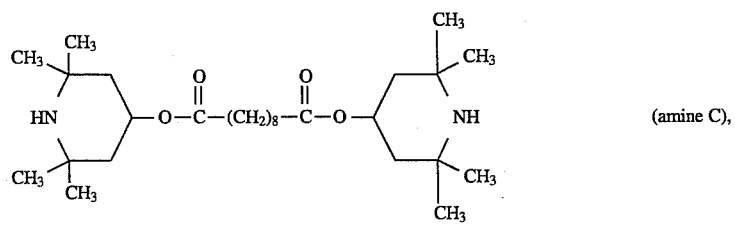

(amine C),

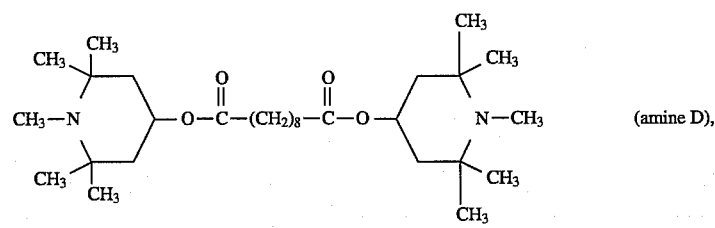

(amine D),

-continued

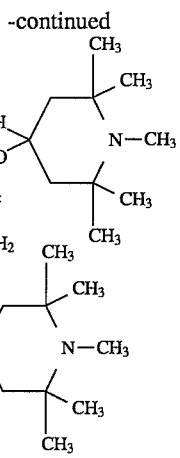

(amine E), and esters of butane-1,2,3,4-tetracarboxylic acid with 2 units each of 1,2,2,6,6-penta-methyl-4-hydroxy-piperidine and $C_{13}H_{27}$—OH (amine F);

compounds of the formula V in which n is 2, G and $G^1$ are hydrogen, $G^{11}$ is hydrogen or methyl and $G^{13}$ is hydrogen or $C_1$–$C_8$alkyl, and $G^{14}$ is $C_2$–$C_8$alkylene or 1—oxo—$C_2$–$C_8$alkylene; an amine from this class which is of particular technical interest is the compound of the formula

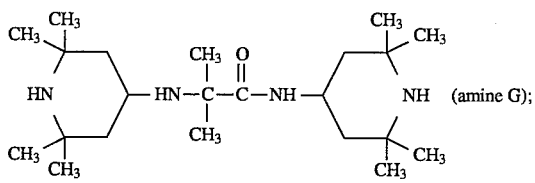

compounds of the formula VIIC in which n is 1, G, $G^1$ and $G^{17}$ are hydrogen, $G^{11}$ is hydrogen or methyl and $T_1$ and $T_2$ together with the C atom linking them form a $C_5$–$C_{14}$cycloalkane ring; an amine from this class which is of particular technical interest is the compound of the formula

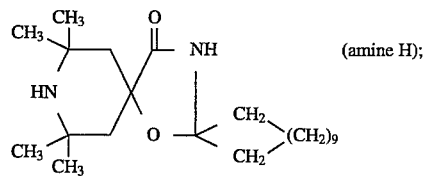

compounds of the formula VIII in which n is 1 or 2 $G^{18}$ and $G^{19}$ are a group of one of the formulae

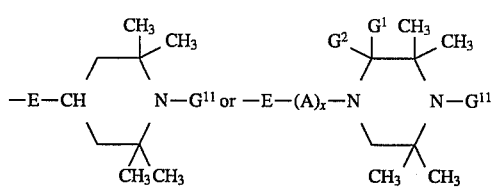

$G^{11}$ is hydrogen or methyl, $G^1$ and $G^2$ are hydrogen or together are a substituent =O, E is —O— or —$NG^{13}$—, A is $C_2$–$C_6$alkylene and x is 0 or 1, $G^{13}$ is hydrogen, $C_1$–$C_{12}$alkyl or cyclohexyl, $G^{20}$, in the case where n is 1, is identical to $G^{18}$ and, in the case where n is 2, is a group —E—B—E—, in which B is $C_2$–$C_8$alkylene or $C_2$–$C_8$alkylene which is interrupted by 1 or 2 groups —N($G^{21}$)—, $G^{21}$ is $C_1$–$C_{12}$alkyl, cyclohexyl, benzyl or $C_1$–$C_4$hydroxyalkyl or a group of the formula

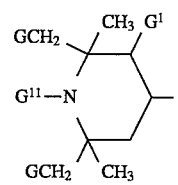

or $G^{21}$ is a group of the formula

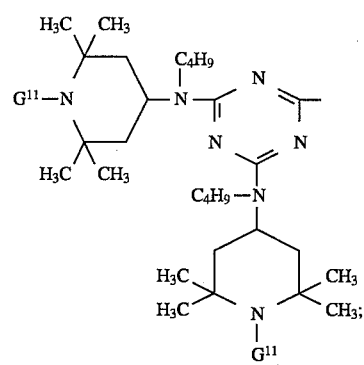

amines from this class which are of particular technical interest are the compound 76) [=amine J] described above and the compounds of the formulae

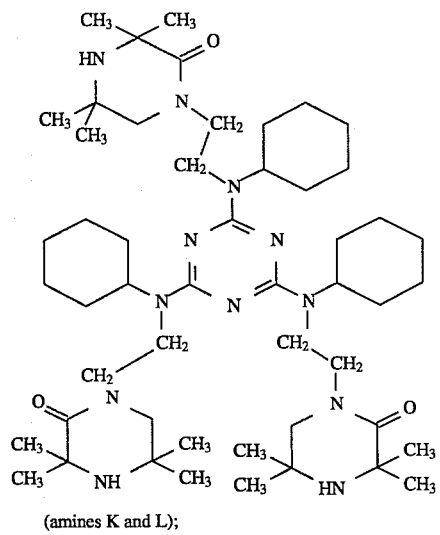
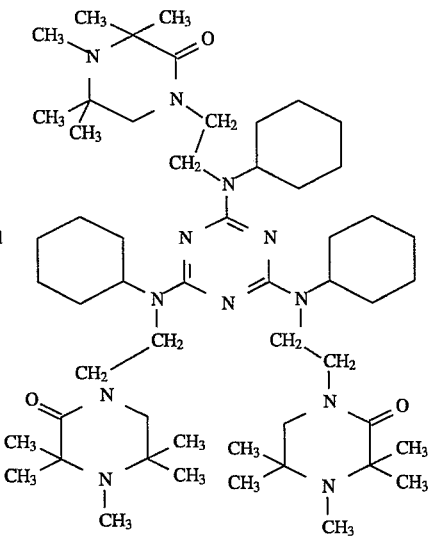

(amines K and L);

compounds of the formula X in which n is 2, $G^{11}$ is hydrogen or methyl and $G^{14}$ is $C_2$–$C_{12}$alkylene;

an amine from this class which is of particular technical interest is the compound 100) [=amine M] described above; and oligomer compounds having 2 to 10 recurring units, such as are obtainable by reaction of

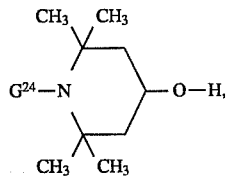

in which $G^{24}$ is $C_2$–$C_5$hydroxyalkyl with an aliphatic $C_2$–$C_{12}$dicarboxylic acid or a suitable reactive derivative, such as the diester, dichloride or anhydride;

(j) of a linear oligomer polyester obtained by reaction of a dialcobol with butane-1,2,3,4-temacarboxylic acid with 2,2,6,6-tetramethyl-4hydroxypiperidine;

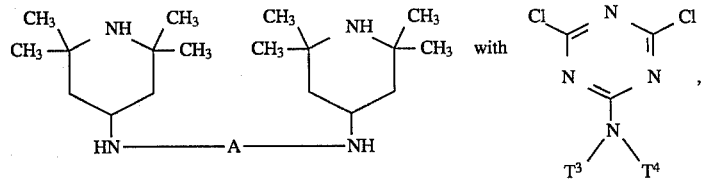

in which A is $C_2$–$C_6$alkylene, $T^3$ is $C_1$–$C_{18}$alkylene or cyclohexyl, $T^4$ is hydrogen or $C_1$–$C_{18}$alkyl, or $T^3$ and $T^4$ together are $C_4$–$C_6$alkylene or $C_3$–$C_5$oxaalkyylene;

(l) of $H_2N$—A—NH—A—$NH_2$ with

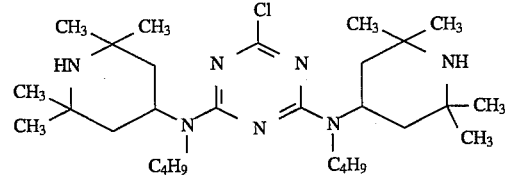

and Br—A—Br, in which A is $C_2$–$C_6$alkylene;

(m) of compounds of the formula

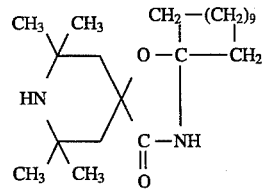

with epichlorohydrin;

(n) of

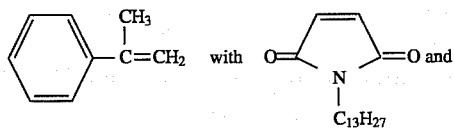

31
-continued
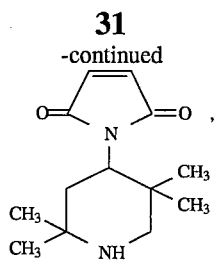
and those of the formula
(o)
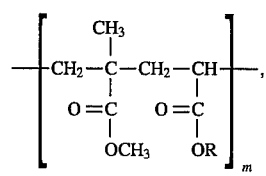
in which about one third of the radicals R are —C₂H₅ and the other are
32
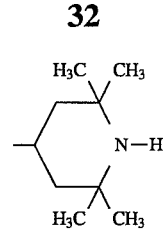
and m is a number from the range 2 to 10;
oligomer amines of particular technical interest include those of the formulae (m again is a number from the range 2 to 10)
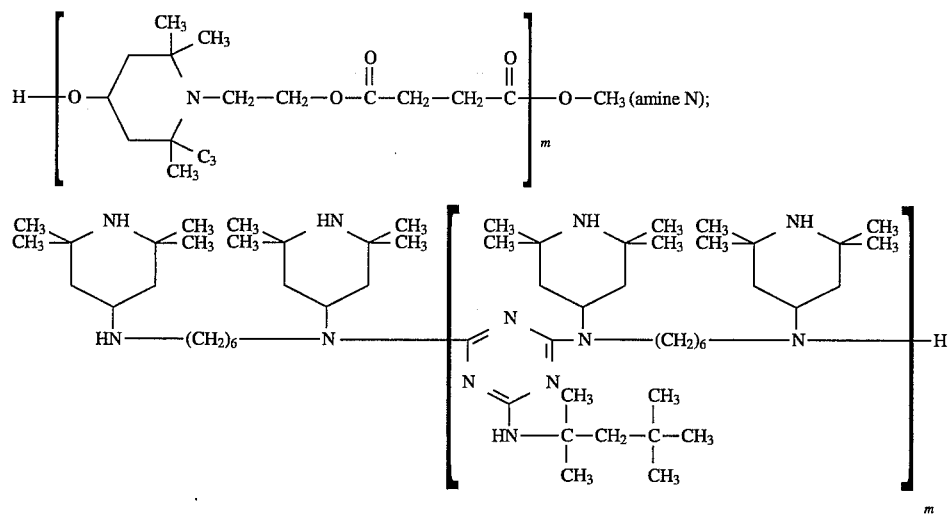
(amine P);
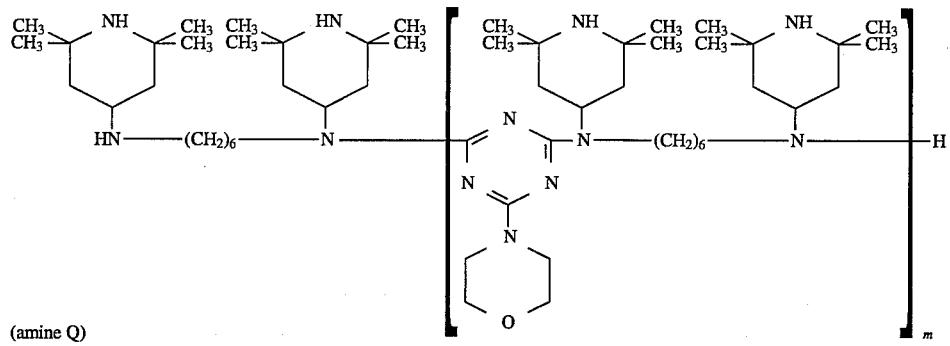
(amine Q)

-continued

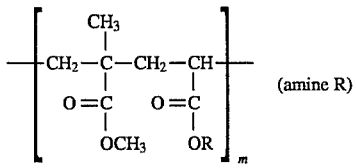 (amine R)

in which about one third of the radicals R are —C₂H₅ and the others are

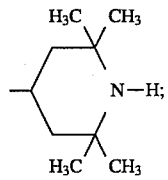

a linear polyester having 2 to 10 recurring units obtained by reaction of butane-1,2,3,4-tetracarboxylic acid with a dialcohol of the formula

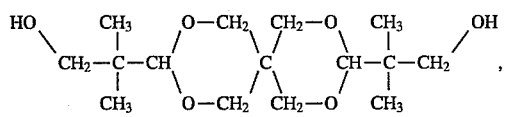

in which the end groups and side chains are formed by esterificadon of the free carboxyl groups with 2,2,6,6-tetramethyl-4-hydroxypiperidine (amine S); a copolymer whose recurring units are composed of 2 units

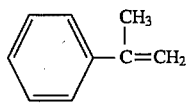

and 1 unit each of

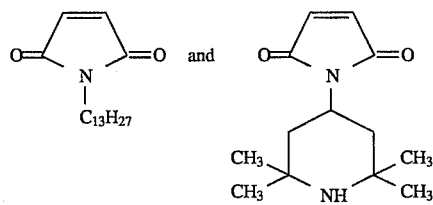

the reaction product of H₂N—(CH₂)₂—NH—(CH₂)₂—NH₂ with

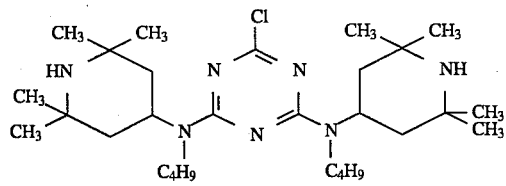

and Br—(CH₂)₂—Br (amine U); and the reaction product of the compound of the formula

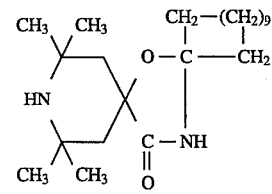

with epichlorohydrin (amine W).

The oligomer amines are often mixtures of compounds which differ from one another with respect to their chain length.

Of particular importance is the use of the amines A, B, C, D, E, F, G, H, J, K, L, M, N, O, P, Q, R, S, T, U, V and W specified above.

In the process according to the invention, preference is given in particular to the addition of those amines whose molecular weight or average molecular weight $\overline{M}_n$ is in the range 300 to 10,000, in particular in the range 1000 to 10,000. Of these, those amines whose molecular weight or average molecular weight $\overline{M}_n$ is in the range 1500 to 10,000, for example in the range 2000 to 7500 should again be mentioned in particular. The amines of higher molecular weight are in particular sterically hindered amines.

The amines mentioned are known compounds; many of them are commercially available.

In the process according to the invention preference is given to stabilization of phosphites or phosphonites having one of the formulae (1) to (7),

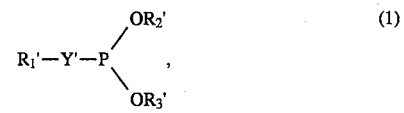 (1)

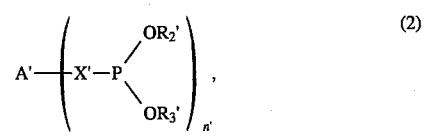 (2)

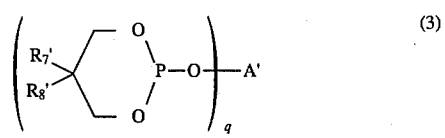 (3)

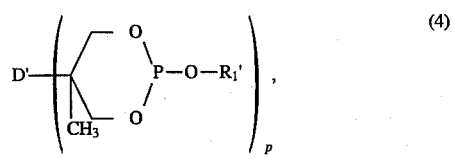 (4)

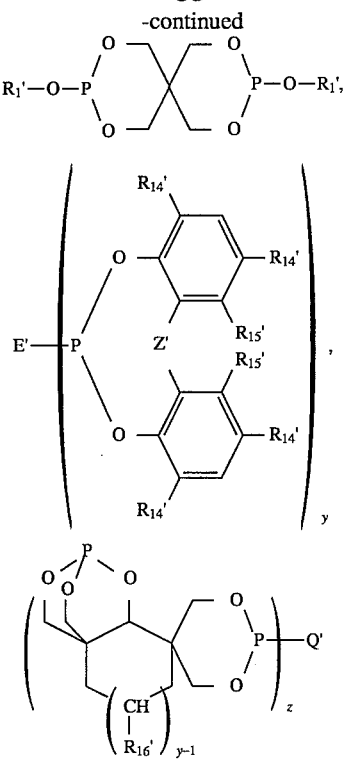

(5)

(6)

(7)

in which the indices are integers and n' is 2, 3 or 4; p is 1 or 2; q is 2 or 3; r is 4 to 12; y is 1, 2 or 3; and z is 1 to 6;

A', in the case where n' is 2, is alkylene having 2 to 18 carbon atoms; alkylene which is interrupted by —S—, —O— or —NR'$_4$— and has 2 to 12 carbon atoms; a radical of one of the formulae

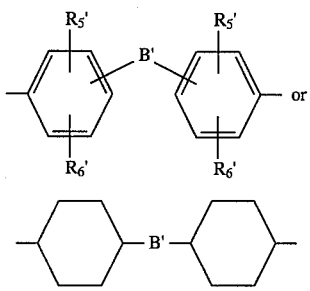

or phenylene;

A', in the case where n' is 3, is a radical of the formula —C$_r$H$_{2r-1}$—;

A', in the case where n' is 4, is a radical of the formula C(CH$_2$—)$_4$;

A", in the case where n' is 2, has the meaning of A';

B' is a radical of the formula —CH$_2$—; —CHR'$_4$—; —CR'$_1$R'$_4$—; —S— or a direct bond; or is C$_5$–C$_7$cycloalkylidene; or is cyclohexylidene which is substituted in the 3, 4 and/or 5 position by 1 to 4 C$_1$–C$_4$alkyl radicals;

D', in the case where p is 1, is methyl and, in the case where p is 2, is —CH$_2$OCH$_2$—;

E', in the case where y is 1, is alkyl having 1 to 18 carbon atoms, phenyl, a radical of the formula —OR'$_1$ or halogen;

E', in the case where y is 2, is a radical of the formula —O—A"—O—;

E', in the case where y is 3, is a radical of the formula R'$_4$C(CH$_2$O—)$_3$;

Q' is the radical of an at least z-valent alcohol or phenol, this radical being attached to the P atom(s) via the alcoholic or phenolic O atom(s);

R'$_1$, R'$_2$ and R'$_3$, independently of one another, are alkyl having 1 to 30 carbon atoms; alkyl which is substituted by halogen, —COOR$_4$', —CN or —CONR$_4$'R$_4$' and has 1 to 18 carbon atoms; alkyl which is interrupted by —S—, —O— or —NR'$_4$, and has 2 to 18 carbon atoms; phenyl—C$_1$–C$_4$alkyl; cycloalkyl having 5 to 12 carbon atoms; phenyl or naphthyl; phenyl or naphthyl each of which is substituted by halogen, 1 to 3 alkyl radicals or alkoxy radicals having a total of 1 to 18 carbon atoms or by phenyl—C$_1$–C$_4$alkyl; or is a radical of the formula

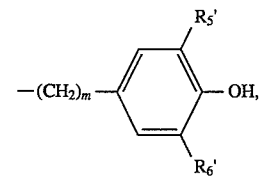

in which m is an integer from the range 3 to 6

R'$_4$ or the radicals R$_4$' independently of one another, are hydrogen; alkyl having 1 to 18 carbon atoms; cycloalkyl having 5 to 12 carbon atoms; or phenylalkyl having 1 to 4 carbon atoms in the alkyl moiety;

R'$_5$ and R'$_6$, independently of one another, are hydrogen; alkyl having 1 to 8 carbon atoms or cycloalkyl having 5 or 6 carbon atoms;

R'$_7$ and R'$_8$, in the case where q is 2, are, independently of one another, C$_1$–C$_4$alkyl or together are a 2,3-dehydropentamethylene radical; and R'$_7$ and R'$_8$, in the case where q is 3, are methyl; the substituents R'$_{14}$, independently of one another, are hydrogen; alkyl having 1 to 9 carbon atoms or cyclohexyl;

the substituents R'$_{15}$, independently of one another, are hydrogen or methyl; and R'16 is hydrogen or C$_1$–C$_4$alkyl and, in the case where several radicals R'$_{16}$ are present, the radicals R'$_{16}$ are identical or different;

X' and Y' are each a direct bond or —O—; and

Z' is a direct bond; —CH$_2$—; —C(R'$_{16}$)$_2$— or —S—.

Particular preference is given to a process in which the phosphite or phosphonite is one of the formulae (1), (2), (5) or (6), in which n' is 2 and y is 1 or 2;

A' is alkylene having 2 to 18 carbon atoms; p-phenylene or p-biphenylene;

E', in the case where y is 1, is C$_1$–C$_{18}$ alkyl, —OR$_1$ or fluorine; and, in the case where y is 2, is p-biphenylene;

R'$_1$, R'$_2$ and R'$_3$, independently of one another, are alkyl having 1 to 18 carbon atoms; phenyl—C$_3$–C$_4$alkyl; cyclohexyl; phenyl; phenyl which is substituted by 1 to 3 alkyl radicals having a total of 1 to 18 carbon atoms;

the substituents R'$_{14}$, independently of one another, are hydrogen or alkyl having 1 to 9 carbon atoms;

R'$_{15}$ is hydrogen or methyl;

X' is a direct bond;

Y' is —O—; and

Z' is a direct bond or —CH(R'$_{16}$)—.

Of particular technical interest is a process for stabilizing a phosphite or phosphonite of one of the formulae (1), (2), (5) or (6), in which n' is 2 and y is 1;

A' is p-biphenylene;

E' is C$_3$–C$_{18}$alkoxy;

R'$_1$, R'$_2$ and R'$_3$, independently of one another, are phenyl which is substituted by 2 or 3 alkyl radicals having a total of 2 to 12 carbon atoms;

the substituents R'$_{14}$, independently of one another, are methyl or tert-butyl;

R'$_{15}$ is hydrogen;

X' is a direct bond;

Y' is —O—; and

Z' is a direct bond, —CH$_2$— or —CH(CH$_3$)—.

Particular preference is given to phosphites, in particular those of the formulae (1) and (5).

The following compounds are examples of phosphites and phosphonites whose stability to hydrolysis can be improved particularly advantageously by the process according to the

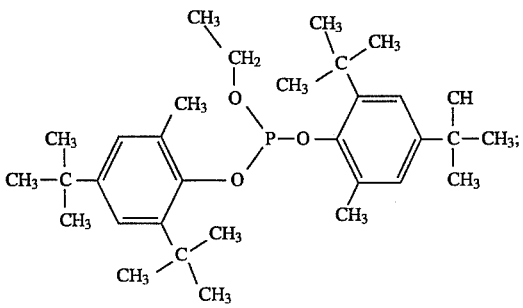
(Ph-1)

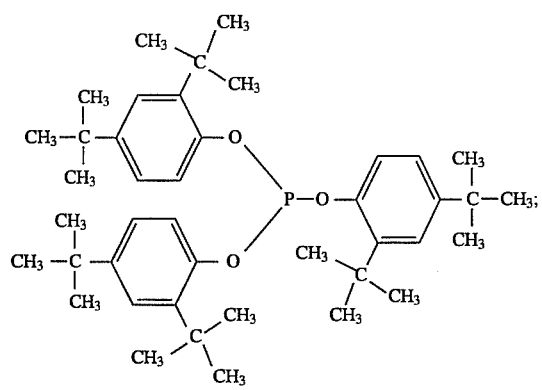
(Ph-2)

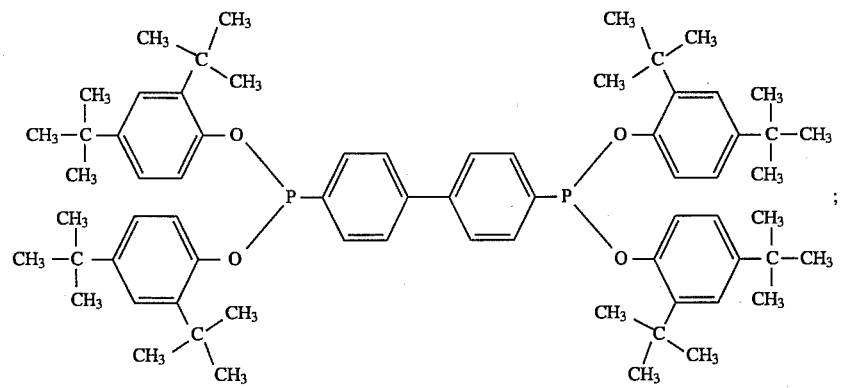
(Ph-3)

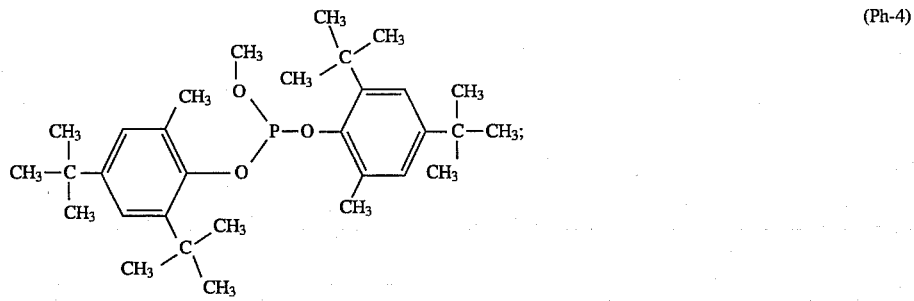
(Ph-4)

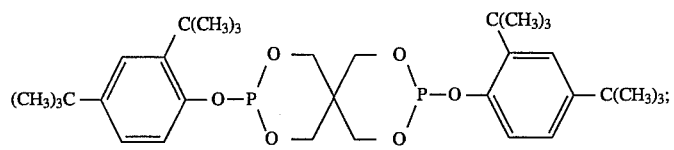
(Ph-5)

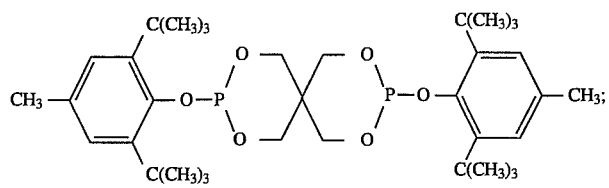
(Ph-6)

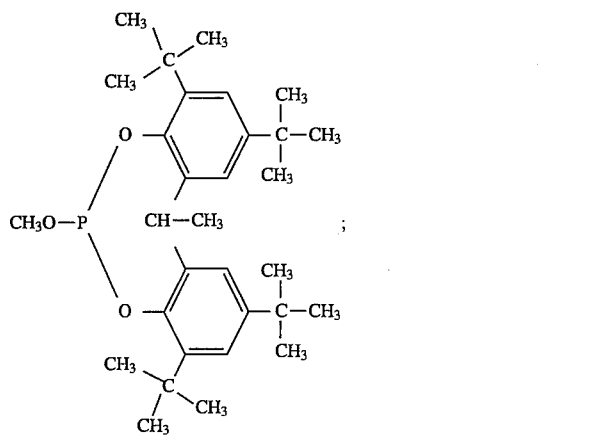
(Ph-7)

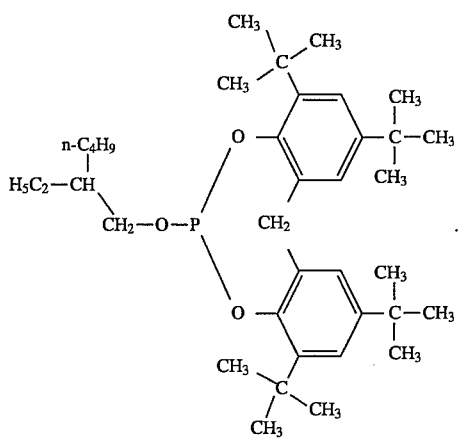
(Ph-8)

The phosphites and phosphonites mentioned are known compounds; some of them are commercially available.

Some commercial phosphites and phosphonites are present as mixtures of compounds or in prestabilized form. In most cases, an mine, for example a lower alkylamine or triisopropanolamine, has been admixed to these compounds in a conventional manner in a concentration of about 1% as prestabilization. The hydrolytic stability of such products can also be significantly improved by the process according to the invention. The products of the process according to the invention can advantageously be used as stabilizers for organic material, in particular organic polymers, for example synthetic polymers, against the damaging effect of heat, oxygen and/or light. Examples of such polymers can be seen, for example, from U.S. Pat. No. 4 855 345, column 4, line 63, up to column 7, line 54.

The phosphites and phosphonites stabilized according to the invention are distinguished by their excellent resistance to hydrolysis and have a long shelf life even at high atmospheric humidity. An organic phosphite or phosphonite stabilized against hydrolysis, such as obtainable by the process described above, is therefore also provided by this invention.

The examples which follow illustrate the process according to the invention further. All parts or percentages given are, just as in the remaining description and in the claims, by weight, unless stated otherwise. As far as percentages are based on phosphite or phosphonite, they refer to phosphite or phosphonite in the melt unless a different reference amount is expressly stated. The structural formulae of the phosphites, phosphonites and amines used in the examples are, if not stated directly, listed above in the text.

EXAMPLE 1

300 g of phosphite Ph-1 are brought to 70°–75° C. together with 225 g of isopropanol, 2.25 g of toluene and 30 g of amine A (=triisopropanolamine) with stirring. The resulting homogeneous melt is added over a period of about 1 hour with stirring to a suspension of 20 g of Ph-1 in 450 g of isopropanol and 20 g of amine A whose temperature during this process is maintained at 20°–30° C. by cooling. The mixture is then cooled to 10°–15° C. and stirred in this temperature range for another 3 hours. The crystalline product is then filterat off and dried at 60° C. under reduced pressure.

Elemental analysis gives an amine A content of 1.2% by weight (relative to phosphite) for the dry product.

A sample serving as comparison is crystallized without adding an amine.

Equal mounts of the product are then subjected to the following tests of resistance to hydrolysis:

a) During storage, the time is measured in which upon visual inspection the initial powder starts to deliquesce (transition p-c) and the time which expires until the material is liquid (transition c-1). At the last-mentioned point in time, the weight increase during the duration of storage is noticed; the weight increase gives an indication of the water absorption of the material. The test conditions (temperature and atmospheric humidity during storage) are given in the particular examples.

b) After 8 hours of storage at 70° C. and 100% atmospheric humidity, the phosphite Ph-1 content is determined by liquid chromatography.

The results can be seen from Table 1.

In Table 1 and the following tables, the column headings have the following meaning:

| | |
|---|---|
| % intr.: | amount of amine in the melt, % given is based on phosphite or phosphonite in the melt; |
| % cont.: | amine content in the phosphite or phosphonite after crystallization; |
| Solv1, %: | main solvent for the melt, % given is based on phosphite or phosphonite in the melt; |
| Solv2, %: | further solvent for the melt, % given is based on phosphite or phosphonite in the melt; |
| T/°C.: | temperature range of the melt or crystallization medium; |
| Solvent, %: | solvent for crystallization medium, % given is based on phosphite or phosphonite in the melt; |
| IPA: | isopropanol; |
| TOL: | toluene; |
| MeOH: | methanol; |
| % seed cr.: | initial charge of phosphite as seed crystals, % given is based on phosphite or phosphonite in the melt; |
| % amine: | initial charge of amine in the crystallization medium, % given is based on phosphite or phosphonite in the melt; |
| % dec. (8 h): | decomposition of the sample after 8 h in % (100% = phosphite content at the beginning of the test) [test b)]; |
| p-c/h: | time in hours until deliquescence begins [test a)]; |
| c-l/h (% W): | time in hours until sample has become liquid (clear solution). Numbers given in brackets: weight increase of the sample compared with the beginning of the test (% by weight is based on the beginning of storage = water content) [test a)]. |

TABLE 1

Stabilization of bis(2,4,-di-tert-butyl-6-methylphenyl) ethyl phosphite (Ph-1)

| | | MELT | | | | | CRYST. MEDIUM | | | | TEST RESULTS | | |
|---|---|---|---|---|---|---|---|---|---|---|---|---|---|
| Ex. No. | Amine | % intr. | % cont. | Solv1, % | Solv2, % | T/°C. | Solvent, % | % seed cr. | % amine | T/°C. | % dec. (8 h) | p-c/h | c-l/h (% W) |
| Comparison | none | 0 | 0 | IPA, 75 | TOL, 0.75 | 70–75 | IPA, 150 | 0 | 0 | 20–30 | 85 (n.2 h) | 005 | 37 (2.5) |
| 1 | A | 10 | 1.2 | IPA, 75 | TOL, 0.75 | 70–75 | IPA, 150 | 6.7 | 6.7 | 20–30 | 5 | 056 | 126 (2.2) |
| 2 | A | 20 | 2.7 | IPA, 75 | TOL, 0.75 | 70–75 | IPA, 150 | 0 | 0 | 20–30 | 3.2 | 110 | 171 (2.0) |
| 3 | Q | 20 | 3.5 | IPA, 75 | TOL, 0.75 | 70–75 | IPA, 150 | 0 | 0 | 20–30 | 5 | 025 | >120 |
| 4 | P | 5 | 1.0 | IPA, 75 | TOL, 0.75 | 70–75 | IPA. 150 | 0 | 0 | 20–30 | 13.4 | 056 | 144 (1.5) |
| 5 | P | 10 | 2.7 | IPA. 75 | TOL, 0.75 | 70–75 | IPA, 150 | 0 | 0 | 20–30 | 3.1 | 160 | 220 |
| 6 | P | 20 | 3.8 | IPA, 75 | TOL, 0.75 | 70–75 | IPA, 150 | 0 | 0 | 20–30 | 1.0 | 200 | 312 (1.1) |
| 7 | C | 20 | 2.9 | IPA, 75 | TOL, 0.75 | 70–75 | IPA, 150 | 0 | 0 | 20–30 | 15.2 | 040 | 72 (2.7) |
| 8 | J | 10 | 1.5 | IPA, 75 | TOL, 0.75 | 70–75 | IPA, 150 | 0 | 0 | 20–30 | 9.5 | 040 | 72 (1.0) |
| 9 | J | 20 | 3.1 | IPA, 75 | TOL, 0.75 | 70–75 | IPA, 150 | 0 | 0 | 20–30 | 2.0 | 135 | 171 (1.3) |
| 10 | H | 10 | 6.5 | IPA, 75 | TOL, 0.75 | 70–75 | IPA, 150 | 0 | 0 | 20–30 | 12.4 | 056 | 120 (1.5) |
| 11 | K | 10 | 1.4 | IPA, 75 | TOL, 0.75 | 70–75 | IPA, 150 | 0 | 0 | 20–30 | 19.4 | 032 | 48 (1.0) |
| 12 | U | 10 | 0.9 | IPA, 75 | TOL, 0.75 | 70–75 | IPA, 150 | 0 | 0 | 20–30 | 4.5 | 056 | 120 (1.6) |
| 13 | E | 10 | 0.9 | IPA, 75 | TOL, 0.75 | 70–75 | IPA, 150 | 0 | 0 | 20–30 | 8.6 | 032 | 48 (0.8) |

EXAMPLE 2–13

Compound Ph-1 is stabilized with amines A, C, E, H, J, K, P, Q and U by the method described in Example 1; however, in contrast to Example 1, no phosphite and no amine are introduced into the crystallization medium at the beginning. The product obtained is tested for resistance to hydrolysis as described in Example 1. The test conditions in test a: storage at 50° C. and 75% atmospheric humidity. Further conditions and test results are summarized in Table 1.

EXAMPLES 14–17

A commercial phosphonite mixture containing Ph-3 as the main component is stabilized by the method described in Examples 2–13; composition of the batch:

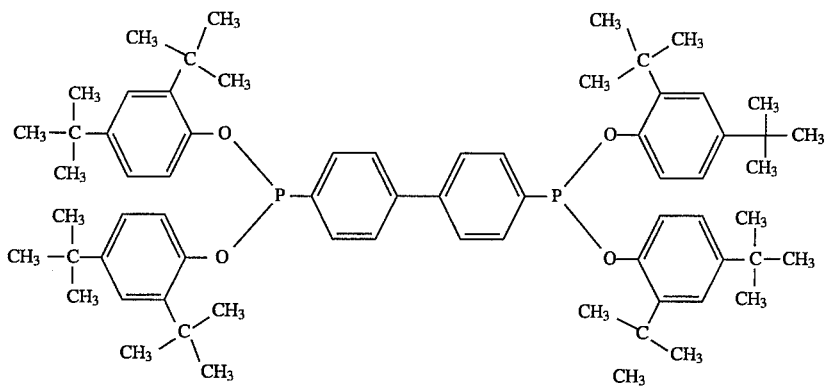
(Ph-3): 43%
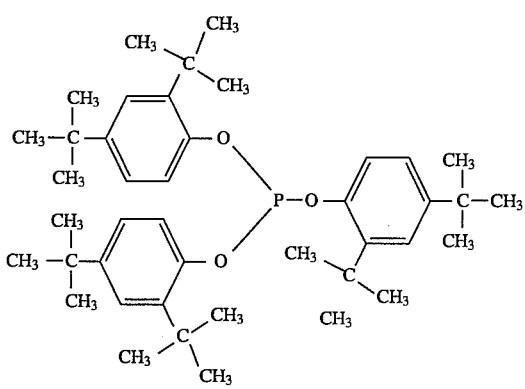
(Ph-2): 17%
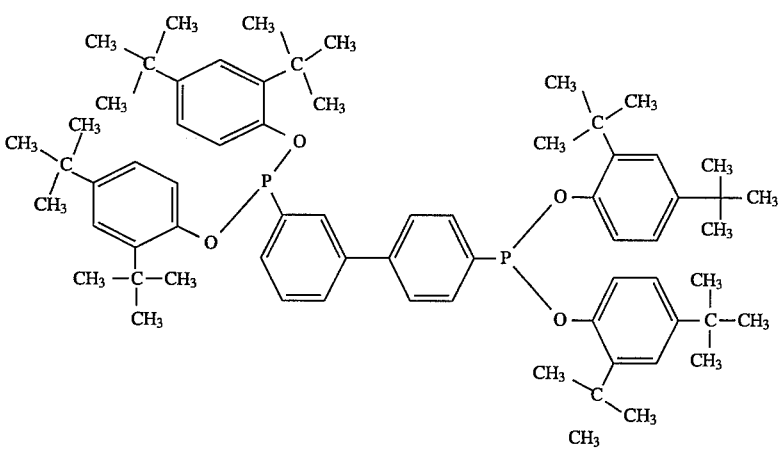
(Ph-3b): 17%
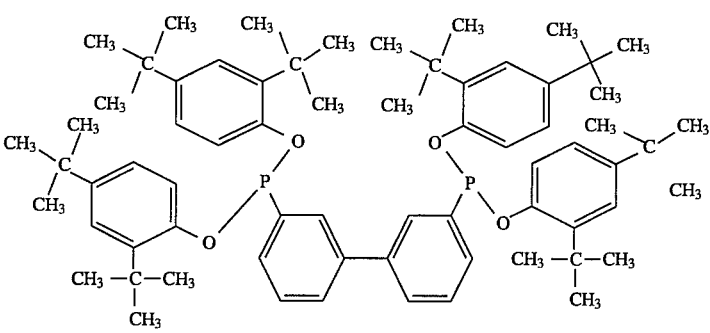
(Ph-3c): 01%

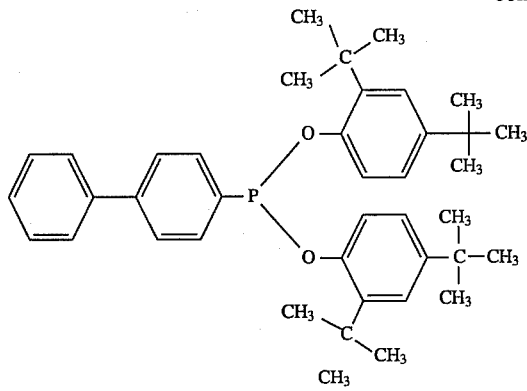

Further compounds:

(Ph-3d): 13%

09%.

The stabilized mixture is tested for resistance to hydrolysis by means of test a); test conditions: storage at 50° C. and 75% atmospheric humidity. Process conditions and test results are summarized in Table 2.

EXAMPLES 18–23

Compounds Ph-5 and Ph-6 are stabilized by the method described in Examples 2–13 and tested for resistance to hydrolysis by means of test a). Test conditions: storage at 50° C. and 75% atmospheric humidity. Test conditions and test results are summarized in Tables 3 and 4.

EXAMPLES 24–29

Compound Ph-2 is stabilized by the method described in Examples 2–13 and tested for resistance to hydrolysis by means of test a); test conditions: storage at 70° C. and 100% atmospheric humidity. Process conditions and test results are summarized in Table 5.

EXAMPLES 30–33

A commercial phosphonite mixture containing Ph-3 as the main component is stabilized by the method described in Examples 2–13; composition of the batch (for formulae, see Examples 14–17):

| | |
|---|---|
| Ph-3: | 35% |
| Ph-2: | 09% |
| Ph-3b: | 20% |
| Ph-3c: | 04% |
| Ph-3d: | 15% |
| further compounds: | 17%. |

The stabilized mixture is tested for resistance to hydrolysis by means of test a); test conditions: storage at 50° C. and 75% atmospheric humidity.

Process conditions and test results are summarized in Table 6.

TABLE 2

Stabilizing of a phosphonite mixture containing the main component of the formula

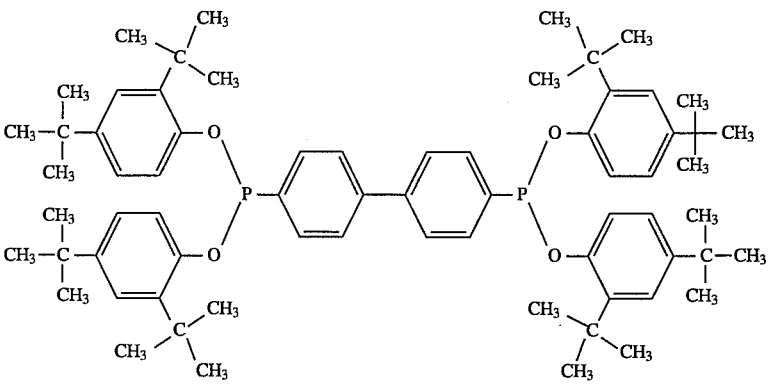
(Ph-3)

| Ex. No. | Amine | % intr. | % cont. | MELT Solv 1, % | Solv 2, % | T/°C. | CRYST. MEDIUM Solvent, % | % seed cr. | % amine | T/°C. | TEST RESULTS p-c/h | c-l/h (% W) |
|---|---|---|---|---|---|---|---|---|---|---|---|---|
| Comparison | none | 0 | 0 | IPA, 300 | — | 60–65 | MeOH, 400 | 0 | 0 | 15–20 | 110 | 150 (15) |
| 14 | J | 20 | 3.4 | IPA, 300 | — | 60–65 | MeOH, 400 | 0 | 0 | 15–20 | >360 | |
| 15 | N | 5 | 5 | IPA, 300 | — | 60–65 | MeOH, 400 | 0 | 0 | 15–20 | 260 | |
| 16 | N | 10 | 10 | IPA, 300 | — | 60–65 | MeOH, 400 | 0 | 0 | 15–20 | >360 | |
| 17 | C | 20 | 2.8 | IPA, 300 | — | 60–65 | MeOH, 400 | 0 | 0 | 15–20 | >360 | |

TABLE 3

Stabilization of the compound of the formula

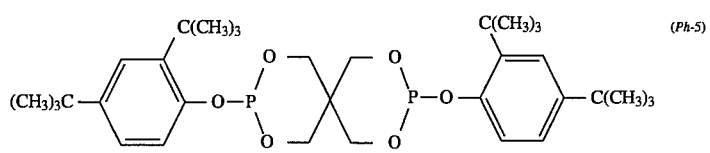
(Ph-5)

| Ex. No. | Amine | % intr. | % cont. | MELT Solv 1, % | Solv 2, % | T/°C. | CRYST. MEDIUM Solvent, % | % seed cr. | % amine | T/°C. | TEST RESULTS p-c/h | c-l/h (% W) |
|---|---|---|---|---|---|---|---|---|---|---|---|---|
| Comp. | none | 0 | 0 | TOL, 250 | — | 75–80 | MeOH, 500 | 0 | 0 | 20–25 | 5 | 17 (30) |
| 18 | A | 20 | 0.5 | TOL, 250 | — | 75–80 | MeOH, 500 | 0 | 0 | 20–25 | 8 | 24 (33) |
| 19 | P | 20 | 2.0 | TOL, 250 | — | 75–80 | MeOH, 500 | 0 | 0 | 20–25 | 8 | 24 (24) |
| 20 | N | 10 | 4.8 | TOL, 250 | — | 75–80 | MeOH, 500 | 0 | 0 | 20–25 | 15 | 48 (37) |
| 21 | N | 20 | 10.5 | TOL, 250 | — | 75–80 | MeOH, 500 | 0 | 0 | 20–25 | 15 | 48 (28) |

TABLE 4

Stabilization of the compound of the formula $$\text{(Ph-6)}$$

[Chemical structure: bis-phosphite with pentaerythritol core linking two 2,4-di-tert-butyl-6-methylphenyl phosphite groups]

| | | MELT | | | | | CRYST. MEDIUM | | | | TEST RESULTS | |
|---|---|---|---|---|---|---|---|---|---|---|---|---|
| Ex. No. | Amine | % intr. | % cont. | Solv 1, % | Solv 2, % | T/°C. | Solvent, % | % seed cr. | % amine | T/°C. | p-c/h | c-l/h (% W) |
| Comp. | none | 0 | 0 | TOL, 500 | IPA, 500 | 75–80 | IPA, 500 | 0 | 0 | 15–20 | 96 | 168 (30) |
| 22 | A | 20 | 1.1 | TOL, 500 | IPA, 500 | 75–80 | IPA, 500 | 0 | 0 | 15–20 | >400 | |
| 23 | N | 20 | 2.0 | TOL, 500 | IPA, 500 | 75–80 | IPA, 500 | 0 | 0 | 15–20 | 210 | 240 |

TABLE 5

Stabilization of tris(2,4,-di-tert-butylphenyl) phosphite (Ph-2)

| | | MELT | | | | | CRYST. MEDIUM | | | | TEST RESULTS | |
|---|---|---|---|---|---|---|---|---|---|---|---|---|
| Ex. No. | Amine | % intr. | % cont. | Solv1, % | Solv2, % | T/°C. | Solvent, % | % seed cr. | % amine | T/°C. | p-c/h | c-l/h (% W) |
| Comparison | none | 0 | 0 | TOL, 200 | — | 75 | IPA, 600 | 0 | 0 | 20–30 | 026 | 47 (27) |
| 24 | N | 2 | 0.7 | TOL, 200 | — | 75 | IPA, 600 | 0 | 0 | 20–30 | 216 | 240 (11) |
| 25 | N | 5 | 1.8 | TOL, 200 | — | 75 | IPA, 600 | 0 | 0 | 20–30 | 216 | 240 (11) |
| 26 | N | 10 | 5.1 | TOL, 200 | — | 75 | IPA, 600 | 0 | 0 | 20–30 | 240 | 312 (16) |
| 27 | N | 25 | 16.1 | TOL, 200 | — | 75 | IPA, 600 | 0 | 0 | 20–30 | >312 | >312 (0) |
| 28 | P | 2 | 0.1 | TOL, 200 | — | 75 | IPA, 600 | 0 | 0 | 20–30 | 192 | 216 |
| 29 | P | 5 | 3.8 | TOL, 200 | — | 75 | IPA, 600 | 0 | 0 | 20–30 | 216 | 240 |

TABLE 6

Stabilization of a phosphonite mixture containing the main component of the formula $$\text{(Ph-3)}$$

[Chemical structure: 4,4'-biphenylene-bis(phosphonite) bearing 2,4-di-tert-butylphenyl substituents]

| | | MELT | | | | CRYST. MEDIUM | | | | TEST RESULTS | |
|---|---|---|---|---|---|---|---|---|---|---|---|
| Ex. No. | Amine | % intr. | % cont. | Solvent, % | T/°C. | Solvent, % | % seed cr. | % amine | T/°C. | p-c/h | c-l/h (% W) |
| Comparison | none | 0 | 0 | IPA, 400 | 75 | MeOH, 400 | 0 | 0 | 20–30 | 24 | 48 (3.4) |
| 30 | N | 5 | 7.5 | IPA, 400 | 75 | MeOH, 400 | 0 | 0 | 20–30 | 348 | 360 (0.2) |

TABLE 6-continued

Stabilization of a phosphonite mixture containing the main component of the formula (Ph-3)

[structure diagram of phosphonite compound Ph-3]

| Ex. No. | MELT | | | | | CRYST. MEDIUM | | | | TEST RESULTS | |
|---|---|---|---|---|---|---|---|---|---|---|---|
| | Amine | % intr. | % cont. | Solvent, % | T/°C. | Solvent, % | % seed cr. | % amine | T/°C. | p-c/h | c-l/h (% W) |
| 31 | N | 10 | 18.2 | IPA, 400 | 75 | MeOH, 400 | 0 | 0 | 20–30 | 504 | 816 (2.2) |
| 32 | N | 25 | 32.3 | IPA, 400 | 75 | MeOH, 400 | 0 | 0 | 20–30 | 648 | 840 (0.9) |
| 33 | P | 2 | 2.1 | IPA, 400 | 75 | MeOH, 400 | 0 | 0 | 20–30 | 240 | 312 (2.6) |

EXAMPLE 34–35

Compound Ph-5 is stabilized by the method described in Examples 2–13. The crystallization medium used is isopropanol without any further addition. The unstabilized and stabilized compound are tested for resistance to hydrolysis by means of test a). Test conditions: storage at 50° C. and 75% atmospheric humidity.

Further process conditions and test result (c-l/h =time in hours until sample becomes deliquescent) are summarized in Table 7.

TABLE 7

Stabilization of the compound of the formula

[structure diagram of compound Ph-5]

| Ex. No. | MELT | | | | | CRYST. MEDIUM RESULTS | | |
|---|---|---|---|---|---|---|---|---|
| | Amine | % intr. | % cont. | Solv., % | T/°C. | Solv., % | T/°C. | c-l/h |
| Comp. | none | 0 | 0 | TOL, 250 | 75 | IPA, 600 | 20–30 | 8 |
| 34 | N | 5 | 1.3 | TOL, 250 | 75 | IPA, 600 | 20–30 | 24 |
| 35 | P | 5 | 0.15 | TOL, 200 | 75 | IPA, 600 | 20–30 | 24 |

The examples show that the phosphites prepared and stabilized according to the invention exhibit much better resistance to hydrolysis in moist air than unstabilized phosphites.

What is claimed is:

1. A crystalline organic phosphite or phosphonite, stabilized against hydrolysis, prepared by introducing a mixture, comprising a phosphite or phosphonite, a solvent or a solvent mixture, and 0.1 to 100% by weight (relative to phosphite or phosphonite) of an amine and having a temperature of 50°–100° C., as a homogeneous melt into a liquid crystallization medium whose temperature during the addition is maintained 10°–70° C. below the temperature of the melh wherein the phosphite is of the formula $P(OR^1)_3$ wherein each radical $R^1$ is independently of the other hydrogen or a hydrocarbon radical which optionally contains a hetero atom selected from the group consisting of N, O, F, Si, P, S, Cl, Br, Sn or I with the proviso that a maximum of two of the three radicals $R^1$ are hydrogen and wherein the phosphonite is of the formula $P(OR^2)_2R^3$ wherein each radical $R^2$ and $R^3$ is each independently of the other as defined for $R^1$ or halogen and wherein the amine is of the formula I

in which $X^1$ and $X^2$, independently of one another, are H, $C_1$–$C_{20}$alkyl, $C_4$–$C_{20}$alkyl which is interrupted by one or more —O— and unsubstituted or substituted by one or more hydroxyl groups, or is $C_2$–$C_{20}$hydroxyalkyl, and $X^3$ is $C_2$–$C_{20}$alkyl, $C_4$–$C_{20}$alkyl which is interrupted by one or more —O— and unsubstituted or substituted by one or more hydroxyl groups, or is —(CH$_2$)$_m$—NX$^1$X$^2$, or C$_2$-C$_{20}$hydroxyalkyl, in which X$^2$ and X$^3$ together are —(CH$_2$)$_m$—, —C$_2$H$_4$—O—C$_2$H$_4$— or —C$_2$H$_4$—NX$^1$—C$_2$H$_4$—, m being an integer from the range 4 to 6 and X$^1$ and X$^2$ being as defined above; or a cyclic sterically hindered amine containing at least one group of the formulae II or III

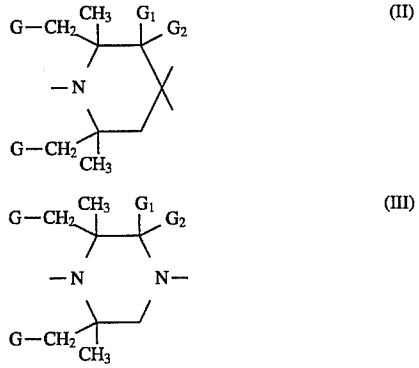

in which G is hydrogen or methyl, and G$_1$ and G$_2$ are hydrogen, methyl or together are =O.

2. A phosphite or phosphonite according to claim 1 wherein the melt comprises an alcohol or a hydrocarbon in an amount of 20 to 500% by weight, relative to the phosphite or phosphonite, as the main solvent or a further solvent in an amount of 0–50% by weight, relative to the main solvent.

3. A phosphite or phosphorlite according to claim 1 wherein the temperature of the melt is 55°–90° C.

4. A phosphite or phosphorlite according to claim 1 wherein tile difference in temperature between melt and crystallization medium is 30°–70° C.

5. A phosphite or phosphonite according to claim 1, wherein the crystallization medium is maintained at a temperature which is at least 10° C. below the resulting temperature of the liquid.

6. A phosphite or phosphonite according to claim 1 wherein 80–800% by weight (relative to the phosphite or phosphonite) of a solvent is used as the crystallization medium.

7. A phosphite or phosphonite according to claim 6 wherein a C$_1$–C$_5$alkanol or a mixture of various C$_1$–C$_5$alkanols is used as the crystallization medium.

8. A phosphite or phosphonite according to claim 6 wherein the crystallization medium consists of a suspension of 2 to 20% by weight of crystalline phosphite or phosphonite, relative to the phosphite or phosphonite in the melt.

9. A phosphite or phosphonite according to claim 1 wherein the crystallization medium is saturated with 50–100% by weight of amine.

10. A phosphite or phosphonite according to claim 1 wherein the melt contains 0.1 to 50% by weight of amine (relative to the phosphite or phosphonite).

11. A phosphite or phosphonite according to claim 1 wherein the amine is a tertiary amine of the formula I or a cyclic sterically hindered amine containing at least one group of the formulae II or III, in which G is hydrogen and G$_1$ and G$_2$ are hydrogen or together are a substituent =O.

* * * * *